United States Patent
Yokomakura et al.

(10) Patent No.: US 9,414,361 B2
(45) Date of Patent: Aug. 9, 2016

(54) CONTROL STATION DEVICE, WIRELESS COMMUNICATION SYSTEM, ALLOCATION METHOD AND PROGRAM

(71) Applicant: Sharp Kabushiki Kaisha, Osaka-shi, Osaka (JP)

(72) Inventors: Kazunari Yokomakura, Osaka (JP); Hiroki Takahashi, Osaka (JP); Jungo Goto, Osaka (JP); Osamu Nakamura, Osaka (JP); Yasuhiro Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 14/378,393

(22) PCT Filed: Feb. 15, 2013

(86) PCT No.: PCT/JP2013/053637
§ 371 (c)(1),
(2) Date: Aug. 13, 2014

(87) PCT Pub. No.: WO2013/122180
PCT Pub. Date: Aug. 22, 2013

(65) Prior Publication Data
US 2015/0003370 A1   Jan. 1, 2015

(30) Foreign Application Priority Data
Feb. 17, 2012 (JP) ................. 2012-032802

(51) Int. Cl.
*H04W 72/04* (2009.01)
*H04L 5/00* (2006.01)
(Continued)

(52) U.S. Cl.
CPC ......... *H04W 72/0406* (2013.01); *H04L 5/0037* (2013.01); *H04L 5/0048* (2013.01); *H04W 4/08* (2013.01); *H04W 52/24* (2013.01); *H04W 72/0453* (2013.01); *H04W 72/12* (2013.01)

(58) Field of Classification Search
CPC ... H04W 84/12; H04W 72/1289; H04W 4/06; H04W 72/121; H04W 72/042; H04W 72/04; H04W 72/005; H04L 5/0091; H04L 5/023; H04L 27/2608
See application file for complete search history.

(56) References Cited

U.S. PATENT DOCUMENTS 8,699,319 B2    4/2014   Yokomakura et al.
2002/0119781 A1* 8/2002  Li ..................... H04L 1/0003
                                                    455/450

(Continued)

FOREIGN PATENT DOCUMENTS

JP    2011-114556 A    6/2011
WO    2009/022709 A1   2/2009

OTHER PUBLICATIONS

Official Communication issued in International Patent Application No. PCT/JP2013/053637, mailed on Apr. 2, 2013.

*Primary Examiner* — Jung-Jen Liu
(74) *Attorney, Agent, or Firm* — Keating & Bennett, LLP

(57) ABSTRACT

Provided is a control station device that is capable of using an easy scheduling scheme in spectrum-overlapped resource management.
The control station device, which allocates a frequency band which multiple communication apparatuses each use for communication, includes a group setting module that divides the multiple communication apparatuses into multiple groups and a scheduling module that determines the frequency band that is allocated to each of the communication apparatuses. In the control station device, the scheduling module allows the allocated frequency band to be shared by the communication apparatuses that are different from each other in terms of the group to which each of the communication apparatuses belongs.

8 Claims, 12 Drawing Sheets

(51) Int. Cl.
  *H04W 52/24*  (2009.01)
  *H04W 4/08*   (2009.01)
  *H04W 72/12*  (2009.01)

(56) References Cited

U.S. PATENT DOCUMENTS

| | | | | |
|---|---|---|---|---|
| 2002/0163879 | A1* | 11/2002 | Li | H04L 5/023 370/200 |
| 2006/0109923 | A1* | 5/2006 | Cai | H04B 7/0619 375/260 |
| 2007/0213084 | A1* | 9/2007 | Birru | H04B 1/71632 455/501 |
| 2008/0300004 | A1* | 12/2008 | Balachandran | H04W 52/146 455/522 |
| 2010/0214997 | A1* | 8/2010 | Tao | H04W 16/12 370/329 |
| 2010/0254332 | A1* | 10/2010 | Cho | H04W 72/1289 370/329 |
| 2010/0266057 | A1* | 10/2010 | Shrivastava | H04L 5/0091 375/260 |
| 2010/0290418 | A1* | 11/2010 | Nishio | H04J 13/004 370/329 |
| 2011/0113433 | A1* | 5/2011 | Koyanagi | H04L 5/0039 718/104 |
| 2011/0205941 | A1* | 8/2011 | Stanforth | H04W 72/0466 370/280 |
| 2011/0212743 | A1 | 9/2011 | Yokomakura et al. | |
| 2012/0275410 | A1 | 11/2012 | Takahashi et al. | |
| 2012/0320837 | A1* | 12/2012 | Kim | H04W 72/042 370/329 |
| 2014/0185594 | A1 | 7/2014 | Yokomakura et al. | |
| 2015/0110062 | A1* | 4/2015 | Nishio | H04J 13/004 370/329 |

* cited by examiner

CONTROL STATION DEVICE, WIRELESS COMMUNICATION SYSTEM, ALLOCATION METHOD AND PROGRAM

TECHNICAL FIELD

The present invention relates to a control station device, a wireless communication system, an allocation method, and a program.

BACKGROUND ART

The Third Generation Partnership Project (3GPP), one of the standard organizations, has almost completed the standardization of 3GPP Long Term Evolution (LTE) Rel-10 (the system hereafter is also referred to as LTE Advanced (LTE-A)), one of the fourth-generation mobile communication systems, and the standardization of LTE Rel-11, an extended version of LTE Rel-10, has currently been under development.

For uplink (communication from user equipment to a base station apparatus) in these systems, Single Carrier Frequency Division Multiple Access (SC-FDMA) is employed. In the Single Carrier Frequency Division Multiple Access, a frequency signal that is DFT-spread is generated by performing discrete Fourier transform (DFT) on a transmit signal. Moreover, the DFT-spread frequency signals are arranged in an arbitrary frequency resource (also called a subcarrier or a resource block (RB)), contiguously in a frequency direction. Furthermore, the DFT-spread frequency signal is divided into a maximum of two clusters, and clustered DFT-Spread Orthogonal Frequency Division Multiple Access (DFT-SOFDMA) is also employed in which each cluster is arranged in an arbitrary frequency resource in a non-contiguous manner.

Moreover, in PTL 1, a frequency-overlapped access as one non-orthogonal access is disclosed that is based on Spectrum-Overlapped Resource Management (SORM) in which at least some of the DFT-spread frequency signals are allowed to be received in an overlapping manner when received in the base station apparatus and thus the frequency resource is allocated to multiple pieces of user equipment that connect to the base station apparatus at the same time. In PTL 1, a basic configuration of the user equipment and the base station apparatus is disclosed, and particularly, a method of detecting overlapping receive signals based on turbo equalization, and the like are included.

On the other hand, in PTL 2, a method is disclosed in which the allocation is performed for the user equipment with the SORM as a necessary antecedent. In PTL 2, the frequency resource is allocated to each of the pieces of user equipment based on Frequency Division Multiple Access (FDMA) and then multiplexing is performed in the user equipment within a range of an allowable overlap rate. Accordingly, the SORM can be realized without an error rate of the transmit signal deteriorating.

CITATION LIST

Patent Literature

PTL 1: PCT Application Publication No. 2009/022709

PTL 2: Japanese Unexamined Patent Application Publication No. 2011-114556

SUMMARY OF INVENTION

Technical Problem

However, in the Spectrum-Overlapped Resource Management as disclosed in PTL 1 and PTL 2 described above, when the frequency band that is used for uplink is allocated to the user equipment, there occurs a problem that the allocation has to be performed in such a manner as to satisfy a condition of the allowable overlap rate and this makes scheduling processing troublesome.

Solution to Problem

An object of the present invention that was made in view of such a situation is to provide a control station device that is capable of using an easy scheduling scheme in spectrum-overlapped resource management, a wireless communication system, an allocation method, and a program.

(1) Because the present invention was made to solve the problems described above, according to an embodiment of the present invention, there is provided a control station apparatus that performs allocation of a frequency band which multiple communication apparatuses each use for communication, the apparatus including: a group setting module that divides the multiple communication apparatuses into multiple groups; and a scheduling module that determines the frequency band that is allocated to each of the communication apparatuses, in which the scheduling module allows the allocated frequency band to be shared by the communication apparatuses that are different from each other in terms of the group to which each of the communication apparatuses belongs.

(2) Furthermore, according to another embodiment of the present invention, the control station device may further include a receive power setting module that sets different target receive levels for every group.

(3) Furthermore, according to another embodiment of the present invention, in the control station device, the group setting module may divide the communication apparatuses into the groups, based on receive power or a path loss.

(4) Furthermore, according to another embodiment of the present invention, in the control station device, the group setting module may divide the communication apparatuses into the groups, based on identification numbers of the communication apparatuses.

(5) Furthermore, according to another embodiment of the present invention, the control station device may further include a reference signal determination module that determines a reference signal that is transmitted by each of the communication apparatuses, in such a manner that the reference signals, transmitted by the communication apparatuses that belong to the different groups, are orthogonal to one another.

(6) Furthermore, according to another embodiment of the present invention, in the control station device, the scheduling module may select the frequency band that is allocated to each of the communication apparatuses, from among the frequency bands that correspond to the group to which the communication apparatus belong, and the frequency band that corresponds to one of the groups may include a frequency band that overlaps the frequency band which corresponds to at least another one of the groups.

(7) Furthermore, according to another embodiment of the present invention, the control station device may further include a signal detection module that detects a signal, transmitted by each of the communication apparatuses, from a receive signal, using an interference cancellation technology.

(8) Furthermore, according to another embodiment of the present invention, there is provided a wireless communication system including: multiple communication apparatuses; and a control station device that performs allocation of a frequency band that each of the multiple communication apparatuses uses for communication, in which the control station device includes, a group setting module that divides the multiple communication apparatuses into multiple groups, and a scheduling module that determines the frequency band that is allocated to each of the communication apparatuses, in which the scheduling module allows the allocated frequency band to be shared by the communication apparatuses that are different from each other in terms of the group to which each of the communication apparatuses belongs.

(9) Furthermore, according to another embodiment of the present invention, there is provided a method of allocating a frequency band that multiple communication apparatuses each use for transmission, the method including: a first process of dividing the multiple communication apparatuses into multiple groups; and a second process of determining the frequency band that is allocated to each of the communication apparatuses, in which in the second process, the scheduling module allows the allocated frequency band to be shared by the communication apparatuses that are different from each other in terms of the group to which each of the communication apparatuses belongs.

(10) Furthermore, according to another embodiment of the present invention, there is provided a program for causing a computer of a control station device, which performs allocation of a frequency band that multiple communication apparatuses each use for communication, to operate as: a group setting module that divides the multiple communication apparatuses into multiple groups; and a scheduling module that determines the frequency band that is allocated to each of the communication apparatuses, in which the scheduling module allows the allocated frequency band to be shared by the communication apparatuses that are different from each other in terms of the group to which each of the communication apparatuses belongs.

Advantageous Effects of Invention

According to the present invention, an easy scheduling scheme can be used in spectrum-overlapped resource management.

DESCRIPTION OF EMBODIMENTS

First Embodiment

Figure 1:
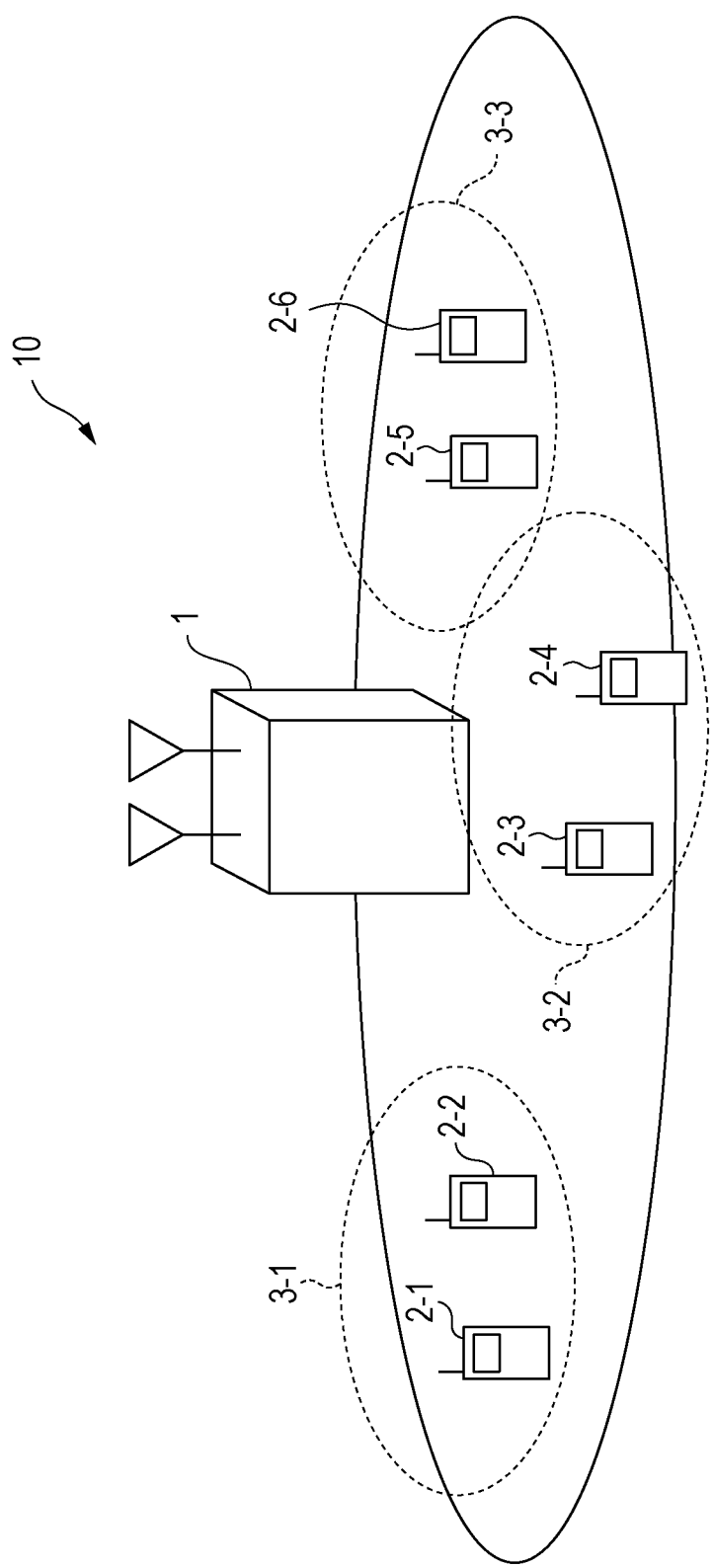
FIG. 1 is a schematic diagram illustrating a configuration of a wireless communication system 10 according to a first embodiment of the present invention.

A first embodiment of the present invention is described below referring to the drawings. FIG. 1 is a schematic diagram illustrating a configuration of a wireless communication system 10 according to the present embodiment. As illustrated in FIG. 1, the wireless communication system 10 is configured to include a base station apparatus 1, and six pieces of user equipment 2-1 to 2-6. The pieces of user equipment 2-1 to 2-6 are positioned within a cell of the base station apparatus 1 and are connected to the base station apparatus 1 at the same time. The pieces of user equipment 2-1 to 2-6 include transmit antennas, respectively. The base station apparatus 1 includes two receive antennas.

The base station apparatus 1 (control station device) divides the multiple pieces of user equipment 2-1 to 2-6 into groups and causes a difference in the receive power for each of the pieces of user equipment 2-1 to 2-6 in the base station apparatus 1 by controlling a target receive level in transmit power control group by group. Furthermore, with frequency scheduling, the base station apparatus 1 allocates an uplink frequency resource (frequency band) to the pieces of user equipment 2-1 to 2-6 included in the groups. At this time, grouping criteria may be determined based on differences in receive power, and may be determined in such a manner that the numbers of pieces of user equipment in each group are equal to one another. In other words, so long as grouping is possible, any method may be used.

At this point, the base station apparatus 1 categorizes the pieces of user equipment 2-1 and 2-2 as a first group 3-1, the pieces of user equipment 2-3 and 2-4 as a second group 3-2, and the pieces of user equipment 2-5 and 2-6 as a third group 3-3. The base station apparatus 1 sets target receive power (target receive level) for the transmit power control of each piece of user equipment 2-1 to 2-6 included in the groups to a value that varies from group to group.

With the transmit power control (TPC) in LTE-A, transmit power, PPUSCH,c(i) in the user equipment, is set based on the following Equation.

[Math. 1]

$$P_{PUSCH,c}(i) = \min\left\{\begin{array}{c} P_{CMAX,c}(i) \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \quad (1)$$

In Equation 1, PCMAX,c(i) is a maximum transmit power value of the user equipment in a c-th cell in an i-th subframe, MPUSCH,c(i) is the number of resource blocks to which the user equipment is allocated in the i-th subframe, PO_PUSCH, c(j) is a nominal target receive power per 1 RB, αc(j) is a parameter of 0 or 1 specific to the cell in a c-th cell, PLc is a value of a path loss that is measured from a down link reference signal in the c-th cell, ΔTF,c(i) is a value that is determined with a modulation scheme and a coding rate in an i-th subframe, and fc(i) is a TPC command in the i-the subframe. Furthermore, for a value j, j=0 expresses dynamic scheduling of packet transmission, j=1 expresses semi-persistent scheduling of voice calls and the like, and j=2 expresses a random access response.

According to the present embodiment, the base station apparatus 1 sets a value, PO_PUSCH,c(j) of each piece of user equipment in such a manner that the value differs depending on the group to which each piece of user equipment belongs. In other words, the pieces of user equipment that belong to the same group are set to the same PO_PUSCH, c(j) but pieces of user equipment that belong to different groups are set to different PO-PUSCH,c(j)'s. For the sake of simplicity, transmit data is hereinafter transmitted with dynamic scheduling (j=0). Furthermore, the setting of αc(j)=1 is provided and thus attenuation over a wireless channel that results from the path loss is completely compensated for. Furthermore, it is assumed that ΔTF,c(i)=0 and fc(i)=0. The pieces of user equipment 2-1 to 2-6 set transmit power using Equation (2) that is obtained by applying these assumption and thus rewriting Equation (1).

[Math. 2]

$$P_{PUSCH,c}(i) = \min\{P_{CMAX,c}(i), 10\log_{10}(M_{PUSCH,c}(i)) + P_{O\_PUSCH,c}(1) + PL_c\} \quad (2)$$

In Equation (2), the base station apparatus 1 changes a value, PO_PUSCH,c that is equivalent to the target receive power (target receive level) for every one of the first group 3-1 to the third group 3-3. For example, the base station apparatus sets PO_PUSCH,c that is applied to the first group 3-1 to a value that differs from that applied to other groups. For example, for the base station apparatus, a value of the first group 3-1 is set to −95 dBm, a value of the second group 3-2 to −100 dBm, and a value of the third group 3-3 to −105 dBm. In the LTE-A, PO-PUSCH,c is expressed as a sum of a cell's own control value and a piece of user equipment (UE)'s own control value. This is true for the present embodiment as well. The user equipment (UE)'s own control value is set by a higher layer. For example, in the base station apparatus 1, the user equipment sets a cell's own control value, PO_NOMINAL_PUSCH to −100 dBm, a piece of user equipment (UE)'s own control value, PO_UE_PUSCH for the pieces of user equipment 2-1 and 2-2 included in the first group 3-1 to 5 dB, the user equipment (UE)'s own control value, PO_UE_PUSCH for the pieces of user equipment 2-3 and 2-4 included in the second group to 0 dB, and, the user equipment (UE)'s own control value, PO_UE_PUSCH for the pieces of user equipment 2-5 and 2-6 included in the third group to −5 dB.

Figure 2:
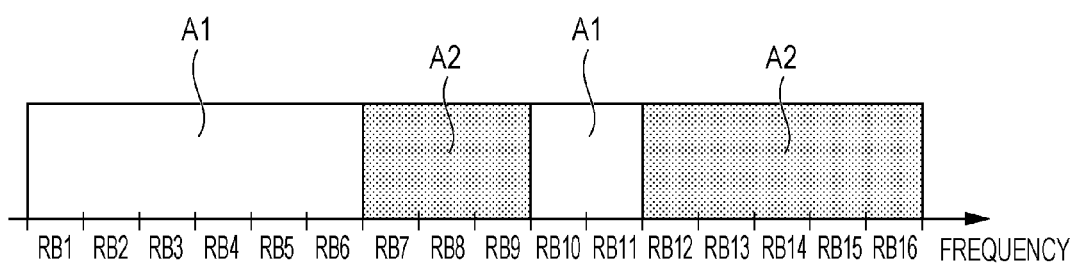
FIG. 2 is a diagram illustrating one example of allocation of a frequency band to a first group 3-1 according to the first embodiment.
Figure 3:
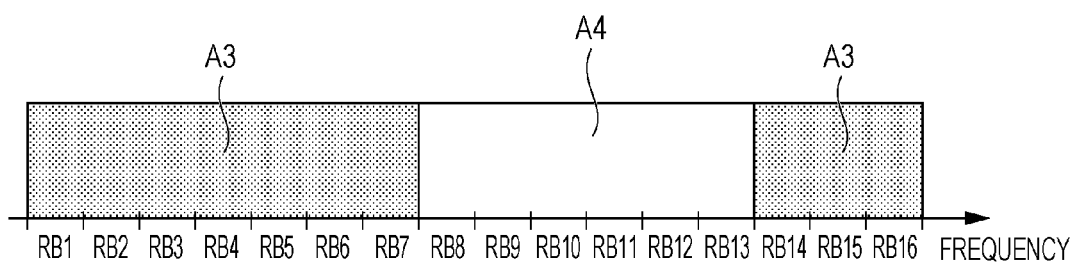
FIG. 3 is a diagram illustrating one example of the allocation of the frequency band to a second group 3-2 according to the first embodiment.
Figure 4:
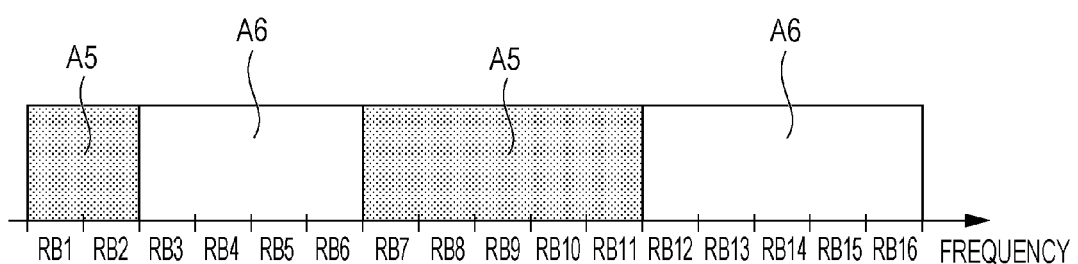
FIG. 4 is a diagram illustrating one example of the allocation of the frequency band to a third group 3-3 according to the first embodiment.

Next, allocation of the frequency resource to each group is described. The allocation of the frequency resource according to the present embodiment is spectrum-overlapped resource management. At this point, the frequency bands that are allocated overlap among the pieces of user equipment that belong to the different groups. One example of the allocation of the frequency band to each group is illustrated in FIGS. 2 to 4. At this point, for a Resource Block (RB) that is allocated to a system band, the number of resource blocks RB1 to RB16 is set to 16. According to the present embodiment, the base station apparatus 1 not only performs the scheduling, based on Frequency Division Multiple Access (FDMA), on all the pieces of user equipment 2-1 to 2-6, but also performs frequency domain scheduling based on the FDMA within each group. That is, the scheduling is performed in such a manner that the frequency bands that are allocated to the pieces of user equipment within a certain group do not overlap with one another.

FIG. 2 illustrates an example of the allocation to the first group 3-1. In FIG. 2, a frequency band A1 that is configured from the resource blocks RB1 to RB6, RB10, and RB11 is a frequency band that is allocated to the user equipment 2-1. Furthermore, a frequency band A2 that is configured from the resource blocks RB7 to RB9 and RB12 to RB16 is a frequency band that is allocated to the user equipment 2-2.

In the same manner, FIG. 3 illustrates an example of the allocation to the second group 3-2. In FIG. 3, a frequency band A3 that is configured from the resource blocks RB1 to RB7 and RB14 to RB16 is a frequency band that is allocated to the user equipment 2-3. Furthermore, a frequency band A4 that is configured from the resource blocks RB8 to RB13 is a frequency band that is allocated to the user equipment 2-4. FIG. 4 illustrates an example of the allocation to the third group 3-3. In FIG. 4, a frequency band A5 that is configured from the resource blocks RB1, RB2, and RB7 to RB11 is a frequency band that is allocated to the user equipment 2-5. Furthermore, a frequency band A6 that is configured from the resource blocks RB3 to RB6 and RB12 to RB16 is a frequency band that is allocated to the user equipment 2-6.

In this manner, the frequency resource is allocated over all the system bands in each group. For the allocation of the frequency resource to each group, a frequency allocation method, such as Proportional Fairness (PF) or Round Robin (RR) that is not dependent on a channel state (also called Non-Channel Dependent Scheduling (Non-CDS)), or a maximum Signal to Interference plus Noise power Ratio (SINR) criteria, or the like may be used. At this time, all the pieces of user equipment included in each group perform transmission at the same time. For this reason, the base station apparatus 1 that is a receiving apparatus performs receiving in a state where signals for each group overlap.

Moreover, according to the present embodiment, each of the pieces of user equipment 2-1 to 2-6 includes one transmit antenna, and the three groups are present. For this reason, the pieces of user equipment, the number of which is greater than the number of the receive antennas of the base station apparatus 1, that is, 2, concurrently use at least one portion of the frequency resource at the same time, and this state is set to be an example of a non-orthogonally overlapping state, but a particular limitation to this is not imposed.

For example, a state where the user equipment that includes multiple transmit antennas performs spatial-multiplexing (also called overload) on items of data, the number of which is greater than the number of the receive antennas, is also a non-orthogonally overlapping state. Furthermore, a case where a sum total of transmit signals that are transmitted in multiple pieces of user equipment which include multiple transmit antennas is greater than the number of the receive antennas is also a non-orthogonally overlapping state. That is, in a certain frequency band, a state where the number of the items of data that are spatial-multiplexed is greater than the number of the receive antennas is called a non-orthogonally overlapping state. Furthermore, such a non-orthogonally overlapping state is called an overlapping state or a non-orthogonal state. When in this state, it is assumed that a transmit signal is an unknown quantity and a frequency response of a channel and a receive signal are known quantities. On this assumption, when simultaneous linear equations expressing a relationship between the transmit signal and the receive signal are established in a certain frequency band (subcarrier), the number of the unknown quantities is the number of the items of data that are spatial-multiplexed, but the number of linear equations is the number of the receive antennas. For this reason, a state where a solution is not obtained only with the simultaneous linear equations occurs.

According to the present embodiment, a case where the number of the groups is greater than the number of the receive antennas (or it may be said of this case that the number of the items of data that are spatial-multiplexed exceeds the number of the receive antennas, or that a spatial resource is not consumed) is assumed such as when the number of the receive antennas is 2 and the number of the groups is 3, but limitation to this is not imposed.

Figure 5:
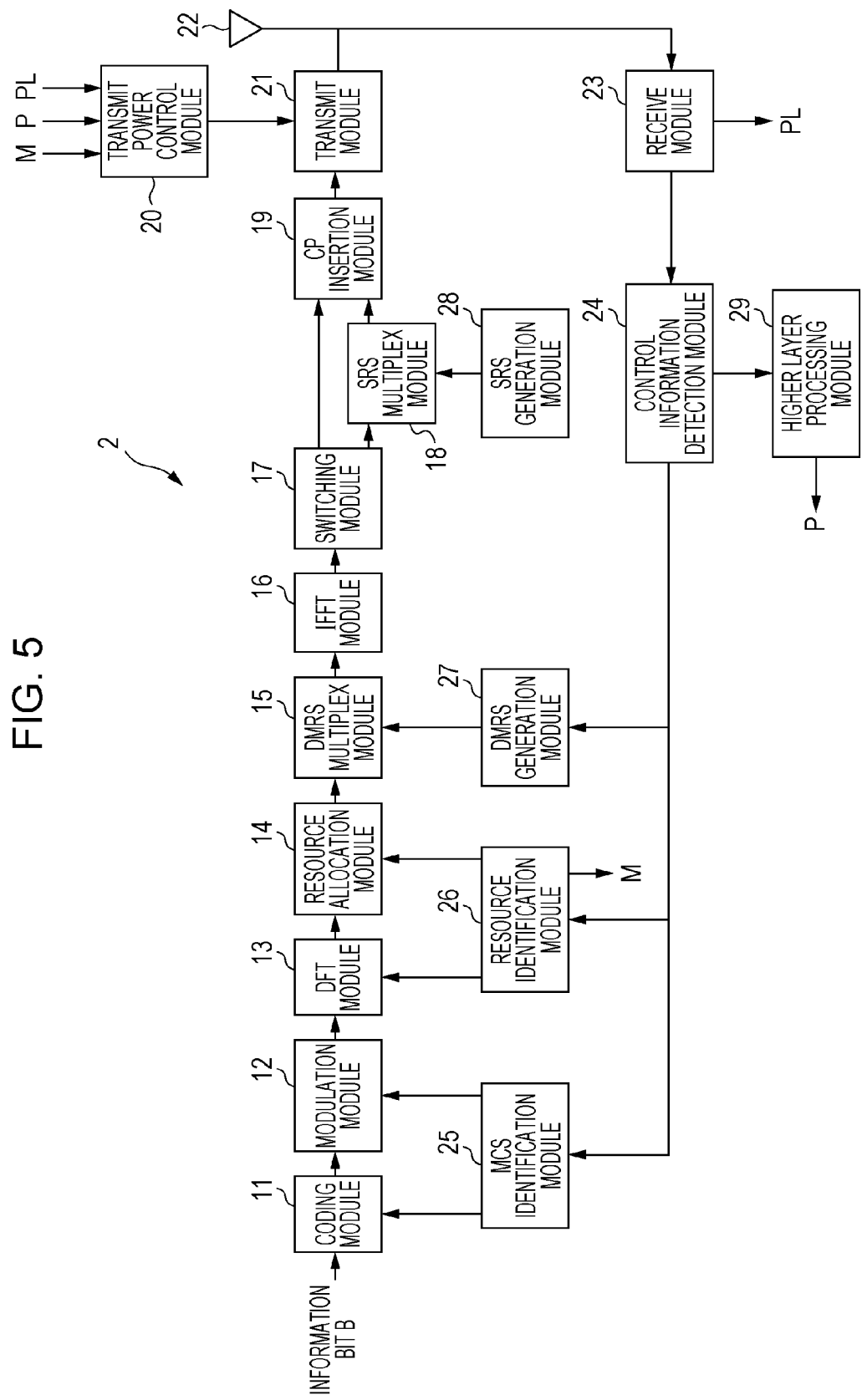
FIG. 5 is a schematic block diagram illustrating a configuration of user equipment 2 according to the first embodiment.

FIG. 5 is a schematic block diagram illustrating a configuration of the user equipment 2 according to the present embodiment. Because the pieces of user equipment 2-1 to 2-6 have the same configuration, these are expressed representatively as the user equipment 2 and the configurations of these are described. The user equipment 2 is configured to include a coding module 11, a modulation module 12, a discrete Fourier transform (DFT) module 13, a resource allocation module 14, a demodulation reference signal (DMRS) multiplexing module 15, an inverse fast Fourier transform (IFFT) module 16, a switching module 17, a sounding-reference signal (SRS) multiplexing module 18, a cyclic prefix (CP) insertion module 19, a transmit power control module 20, a transmit module 21, a transmit and receive antenna 22, a receive module 23, a control information detection module 24, a modulation and coding scheme (MCS) identification module 25, a resource identification module 26, a DMRS generation module 27, an SRS generation module 28, and a higher layer processing module 29.

Through the transmit and receive antenna 22, the receive module 23 receives a control signal that the base station apparatus 1 transmits to the user equipment 2. The receive module 23 performs down conversion, Analog to Digital (A/D) conversion, and the like on the received control signal, and generates digital data. Furthermore, the receive module 23 calculates a path loss PL between the base station apparatus 1 and the user equipment 2, based on the receive power of the received signal and outputs the calculated path loss PL to the transmit power control module 20. The control signal detection module 24 extracts control information from the digital data. At this point, modulation and coding schemes (MCS) indicating a combination of the modulation scheme and the coding rate, a reference signal sequence, frequency allocation information, the control information on the higher layer, and the like are included. However, the control information that is received may be control information that is used in transmit control, and limitation to the pieces of control information described above is not imposed. The user equipment 2 transmits the transmit data according to these pieces of information. Moreover, the base station apparatus 1 may transmit the control information that is common to all the pieces of user equipment 2 that communicate with the base station apparatus 1, as the control signal that is broadcast, not as the control signal that is transmitted to specific user equipment 2.

The control signal detection module 24 notifies the MCS identification module 25 of the number (also called a transport block size) of information bits that are indicated by the detected control information, the coding rate, and the modulation scheme. Furthermore, the control signal detection module 24 notifies the resource identification module 26 of the number of DFT points and a resource index that are indicated by control bits that are detected. At this point, the number of DFT points is the number of modulation symbols at the time of performing DFT. Furthermore, the resource index is also called frequency band allocation information, and indicates a frequency position (a subcarrier, a resource block, and a frequency band) in which a frequency signal is arranged. Moreover, the control signal detection module 24 may calculate the number of DFT points from the resource index included in the control information, without the number of DFT points being included in the control information. Specifically, a method is considered in which the number of the subcarriers that are included in the frequency band that is indicated by the resource index is set to be the number of DFT points and so forth.

Furthermore, the control signal detection module 24 notifies the DMRS generation module 27 of a pattern of a demodulation reference signal (DMRS) that is indicated by the detected control bits. At this point, the pattern of the demodulation reference signal, for example, is information that assigns a code sequence that is used as the demodulation reference signal, and a subcarrier in which the demodulation reference signal is arranged. Furthermore, the control signal detection module 24 outputs the control information on the detected higher layer to the higher layer processing module 29. The cell's own control value, PO_NOMINAL_PUSCH, or the user equipment (UE)'s own control value, PO_UE_PUSCH in the transmit power control described above is included in the control information on the higher layer.

The MCS identification module 25 notifies the coding module 11 of the transport block size and the coding rate that are notified from the control signal detection module 24. Furthermore, the MCS identification module 25 notifies the modulation module 12 of the modulation scheme that is notified from the control signal detection module 24. The resource identification module 26 notifies the DFT module 13 of the number of DFT points that is notified from the control signal detection module 24. Furthermore, the resource identification module 26 notifies the resource allocation module 14 of the resource index that is notified from the control signal detection module 24. Furthermore, the resource identification module 26 calculates the number M of the resource blocks that are allocated, based on the resource index, and outputs the calculated number M to the transmit power control module 20. The IDMRS generation module 27 generates the demodulation reference signal (DMRS) of the pattern that is notified from the control signal detection module 24 and thus outputs the generated demodulation reference signal (DMRS) to the demodulation reference signal multiplexing module 15.

The coding module 11 divides the information bits that are input, for every number of bits of the notified transport block size. The coding module 11 performs error correction coding on the divided information bits using the notified coding rate and generates coding bits. The modulation module 12 modulates the coding bits according to the notified modulation scheme, and thus generates a modulation signal, using a modulation scheme, such as quaternary phase shift keying (QPSK), 16-ary quadrature amplitude modulation (16 QAM), and the like. The DFT module 13 performs time frequency conversion on the modulation signal with the notified number of DFT points and thus generates the frequency signal.

The resource allocation module 14 arranges the frequency signal in the frequency position that is assigned by the notified resource index. The DMRS multiplexing module 15 time-multiplexes DMRS onto a signal in which the frequency signal is arranged by the resource allocation module 14 in each frequency position. Moreover, the frequency position in which the DMRS is multiplexed is the same as the frequency position in which the resource allocation module 14 arranges the frequency signal. Moreover, the multiplexing may be performed in such a manner that the DMRS can be used when the demodulation (signal detection) is performed at the receiving side, and a multiplexing scheme (time multiplexing, frequency multiplexing, and the like) with which the DMRS is multiplexed and the frequency position in which the DMRS is multiplexed are not limited to this. The IFFT module 16 performs inverse fast Fourier transform (IFFT) on the DMRS multiplexed signal, and thus generates a time signal (also called a time domain signal). Moreover, the IFFT is performed with the number (system band) of FFT points that are defined in the system.

The switching module 17 determines whether or not a subframe in which the time signal generated by the IFFT module 16 is transmitted is a subframe in which a sounding reference signal (SRS) is transmitted. Moreover, the subframe is a minimum unit in a time direction when the resource is allocated to the user equipment 2, and is configured by time-multiplexing DFT blocks (a unit in which the DFT module 13 performs the processing) the number of which is predetermined. Furthermore, the subframe is also called a frame, a packet, or the like. The SRS is a reference signal for measuring (sounding) a channel state in the base station apparatus 1. The channel state is used when the allocation of the frequency band to each piece of user equipment 2 is determined as described below and so forth. If it is determined that the subframe in which the time signal generated by the IFFT module 16 is transmitted is the subframe in which the SRS is transmitted, the switching module 17 outputs the time signal generated by the IFFT module 16 to the sounding reference signal multiplexing module 18. On the other hand, if it is determined that the subframe in which the time signal generated by the IFFT module 16 is transmitted is not the subframe in which the SRS is transmitted, the switching module 17 outputs the time signal to the CP insertion module 19.

The SRS generation module 28 generates the sounding reference signal. The sounding reference signal multiplexing module 18 time-multiplexes the time signal that is input from the switching module 17 and the SRS, and thus outputs the multiplexed time signal and SRS to the CP insertion module 19. The CP insertion module 19 inserts a cyclic prefix (CP) into the time signal that is input from the sounding reference signal multiplexing module 18 or the switching module 17.

The CP copies the rear portion of the time signal for every DFT block only by a length that is defined in advance. The transmit module 21 performs transmit processing on the time signal into which the CP is inserted, such as digital to analog (D/A) conversion, up conversion, and amplification of the transmit signal according to a transmit power value that is assigned from the transmit power control module 20, and then transmits the transmit signal from the transmit and receive antenna 22 to the base station apparatus 1.

The higher layer processing module 29 processes the control information on the higher layer that is output by the control information detection module 24. For example, the higher layer processing module 29 obtains the cell's own control value, PO_NOMINAL_PUSCH, and the user equipment (UE)'s own control value, PO_UE_PUSCH from the control information on the higher layer, and outputs these as transmit power control information P to the transmit power control module 20. The transmit power control module 20 calculates the transmit power value, based on the path loss PL that is received from the receive module 23, the transmit power control information P that is received from the higher layer processing module 29, and the number M of the resource blocks that is received from the resource identification module 26, and outputs the calculated transmit power value to the transmit module 21. The transmit power control module 20 substitutes the path loss PL for PLc in Equation (2) described above, substitutes the number M of the resource blocks for MPUSCH,c(i), substitutes a sum of the cell's own control value, PO_NOMINAL_PUSCH and the user equipment (UE)'s own control value, PO_UE_PUSCH, for PO_PUSCH,c(1), and thus calculates PPUSCH,c(i) that is the transmit power value in an i-th frame. Moreover, PCMAX,c(i) may be set in advance to be in the transmit power control module 20, and may be determined according to the number M of the resource blocks and the like.

Figure 6:
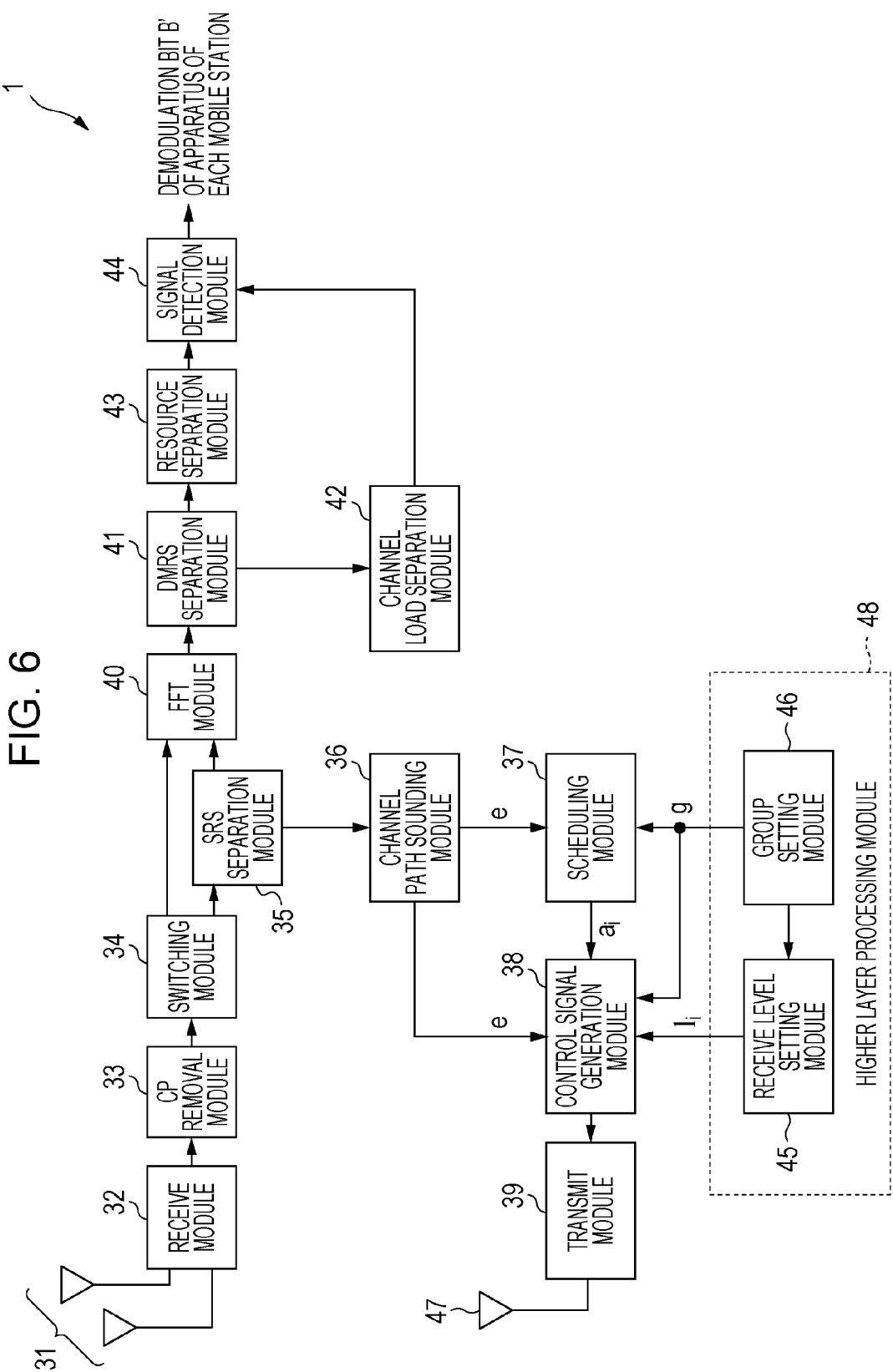
FIG. 6 is a schematic block diagram illustrating a configuration of a base station apparatus according to the first embodiment.

FIG. 6 is a schematic block diagram illustrating a configuration of the base station apparatus 1 according to the present embodiment. The base station apparatus 1 is configured to include a receive antenna module 31, a receive module 32, a CP removal module 33, a switching module 34, an SRS separation module 35, a channel sounding module 36, a scheduling module 37, a control signal generation module 38, a transmit module 39, an FFT module 40, a DMRS separation module 41, a channel estimation module 42, a resource separation module 43, a signal detection module 44, a transmit antenna 47, and a higher layer processing module 48. The higher layer processing module 48 is configured to include a receive level setting module 45 and a group setting module 46.

The receive antenna module 31 includes two receive antennas that receive the signal that is transmitted by the user equipment 2-1 to 2-6. The receive module 32 performs receive processing, such as down conversion or A/D conversion, on the signal that is received by the two receive antennas of the receive antenna module 31, and obtains digital signals that correspond to the two receive antennas, respectively. The CP removal module 33 removes the cyclic prefix (CP) from the two digital signals. The switching module 34 determines whether the two signals from which the CP is removed are in the subframe in which the sounding reference signals (SRS) are multiplexed. At this point, if it is determined that the two signals are not in the subframe in which the SRS's are multiplexed, the switching module 34 outputs to the FFT module 40 the two signals, as are, from which the CP is removed. On the other hand, if it is determined that the two signals are in the subframe in which the SRS's are multiplexed, the switching module 34 outputs to the sounding reference signal separation module 35 the two signals, as are, from which the CP is removed. The SRS separation module 35 separates the SRS from the two signals from which the CP is removed. The SRS separation module 35 outputs the separated SRS to the channel sounding module 36, and outputs to the FFT module 40 the remaining portion of each of the two signals from which the CP is removed.

The channel sounding module 36 calculates a channel state e of the frequency in which the SRS is arranged, from the SRS that is separated by the SRS separation module 35. Moreover, because each of the pieces of user equipment 2-1 to 2-6 transmits the SRS, the channel sounding module 36 performs calculation of the channel state on each of the pieces of user equipment 2-1 to 2-6. Moreover, according to the present embodiment, the calculation of the channel state is performed in units of resource blocks (12 subcarriers), but may be performed in other transmit control units, such as units of subcarriers. The channel state, for example, is a receive SINR (signal to interference plus noise ratio) or communication capacity (channel capacity).

The scheduling module 37 determines the frequency band that is allocated to each piece of user equipment 2-1 to 2-6 and the number of DFT points in the next transmission, based on the channel state e calculated by the channel sounding module 36. The scheduling module 37 according to the present embodiment allows the allocated frequency bands to be shared by the pieces of user equipment 2-1 to 2-6 that are different from one another in terms of the group to which each of the pieces of user equipment belongs, while the groups to which the pieces of user equipment belong are different from each other. When the frequency band to be allocated is determined, the scheduling module 37 uses group information g that is output by the group setting module 46 described below, as well. Furthermore, in addition to the allocation of the frequency band, the scheduling module 37 determines the coding rate and the modulation scheme (MCS) as well for every piece of user equipment 2-1 to 2-6. The scheduling module 37 outputs these pieces of information ai (i is from 1 to 3 and indicates the group) to the control signal generation module 38. Moreover, a method is described below in which the frequency is allocated by the scheduling module 37. The control signal generation module 38 generates the control information for each of the pieces of user equipment 2-1 to 2-6, based on information li indicating the target receive level, which is input from the receive level setting module 45, the information ai that is received from the scheduling module 37, the channel state e that is received from the channel sounding module 36, and the group information g that is received from the group setting module 46, and generates the control signal indicating the control information. For each piece of user equipment to which the frequency band is allocated at the transmit timing corresponding to the control information, among the pieces of user equipment 2-1 to 2-6, the control information includes the resource index indicating the result of the allocation of the frequency band, information indicating the number of DFT points, information indicating the coding rate and the modulation scheme, information indicating the pattern of the demodulation reference signal, and information indicating the target receive level. The transmit module 39 performs wireless transmit processing, such as up conversion or D/A conversion, on the control signal, and then transmits a result of the wireless transmit processing to each of the pieces of user equipment 2-1 to 2-6 through the transmit antenna 47.

The FFT module 40 performs the time frequency conversion on each of the two signals that are input from the switching module 34 or the sounding reference signal separation module 35, using fast Fourier transform, and thus generates two frequency signals. The DMRS separation module 41 separates the DMRS from each of the two frequency signals. At this point, the DMRS separation module 41 separates from each of the two frequency signals the DMRS transmitted by the user equipment 2 that is a detection target. At this point, the user equipment 2 that is the detection target is the user equipment 2 to which the frequency band (resource block) is allocated by the scheduling module 37 in such a manner that the transmission of the information bits is possible at the transmit timing, among the pieces of user equipment 2-1 to 2-6. The DMRS separation module 41 outputs the separated DMRS to the channel estimation module 42, and outputs the remaining portion of each of the two frequency signals to the resource separation module 43. The channel estimation module 42 estimates channel performance of the subcarrier (discrete frequency) that the user equipment 2 which is the detection target uses for transmission, and noise power that includes interference from other cells, and outputs the obtained result to the signal detection module 44. At this point, the channel estimation module 42 estimates the channel performance and the noise power for every combination of the transmit and receive antenna 22 of the user equipment 2 that is the detection target and two receive antennas of the receive antenna module 31.

The resource separation module 43 extracts only the signal in the frequency band that the user equipment 2 which is the detection target uses for transmission, from each of the two frequency signals that are input from the DMRS separation module 41. Moreover, the frequency band that the user equipment 2 which is the detection target uses for transmission is the frequency band that the scheduling module 37 allocates to the user equipment 2. For this reason, the resource separation module 43 obtains the information from the scheduling module 37. The signal detection module 44 performs signal detection, such as receive diversity composition, equalization, demodulation of a modulation symbol, and error correction decoding, on the signal that is extracted by the resource separation module 43, and obtains decode bits B' corresponding to information bits B that are input into the user equipment 2 that is the detection target.

Moreover, as described below, the frequency bands that are allocated to the pieces of user equipment 2-1 to 2-6, respectively, overlap among the pieces of user equipment 2-1 to 2-6. For this reason, when the signal detection module 44 performs signal detection, the signal detection includes processing that separates the signal from the user equipment 2 that is the detection target, from the frequency signal in the overlapping frequency bands. Such separation processing is performed using an interference cancellation technology. As the interference cancellation technology, interference canceling due to non-linear iteration equalization (turbo equalization) based on a turbo principle may be used, and like successive interference cancellation (SIC), serial interference canceling may be used that detects serially the signal of the user equipment 2 that is the detection target, by performing ranking. Furthermore, like parallel interference cancellation (PIC), interference canceling may be used that detects in parallel the signals of the multiple pieces of user equipment 2 that are the detection target.

In the higher layer processing module 48, the group setting module 46 divides the pieces of user equipment 2-1 to 2-6 into multiple groups. For example, the group setting module 46, for example, groups the pieces of user equipment 2 that are at a short distance from one another. At this point, the number of the groups that are set by the group setting module 46 is "3" that is set in advance, and is greater than the number of the receive antennas that the receive antenna module 31 has, but limitation to this is not imposed. For example, the number of groups may be changed according to the number of pieces of user equipment 2 that communicate with the base station apparatus 1 at the same time, a sum total of bit rates required, or the like. The group setting module 46 outputs the group information g indicating each group that results from the division, to the scheduling module 37 and the receive level setting module 45. At this point, the group information g is information indicating which one of the groups the user equipment 2 belongs to. The receive level setting module 45 sets the target receive level for each group that is indicated by the group information g that is output by the group setting module 46, and notifies the control signal generation module 38 of the information li (i indicates the group) indicating the target receive level. For example, the receive level setting module 45 sets the user equipment (UE)'s own control value, PO_UE_PUSCH, for each group, and outputs a result of setting as the information indicating the target receive level. Accordingly, a value, PO_PUSCH,c that is a sum of the cell's own control value, PO_NOMINAL_PUSCH and the UE's own control value, PO_UE_PUSCH, and that is the target receive level is a value that differs from group from group.

Figure 7:
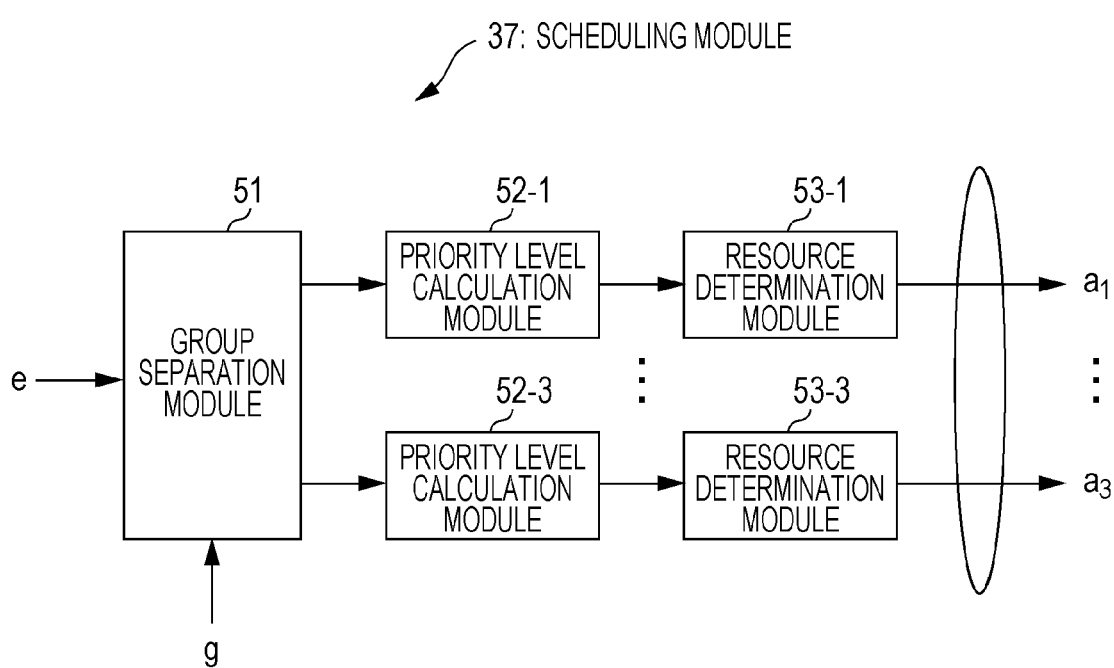
FIG. 7 is a schematic block diagram illustrating a configuration of a scheduling module 37 according to the first embodiment.

FIG. 7 is a schematic block diagram illustrating a configuration of the scheduling module 37 according to the present embodiment. The scheduling module 37 is configured to include a group separation module 51, priority level calculation modules 52-1 to 52-3, and resource determination modules 53-1 to 53-3. Moreover, the scheduling module 37 includes priority level calculation modules and resource determination modules, the number of each depending on the number of groups that is set by the group setting module 46. As described above, according to the present embodiment, because the number of groups is "3", the scheduling module 37 includes three priority level calculation modules and three resource determination modules. If the number of groups that is set exceeds "3", the scheduling module 37 includes the priority level calculation modules and the resource determination modules, with the number of each being equal to the number of the corresponding groups.

A group separation module 37 separates the channel state e that is calculated by the channel sounding module 36, for every group that is indicated by the group information g that is output by the group setting module 46, and thus outputs a result of each separation to the priority level calculation modules 52-1 to 52-3. That is, among the channel states e, the group separation module 37 outputs to the priority level calculation module 52-1 a value indicating a channel state of a channel from any one of the pieces of user equipment 2-1 and 2-2 that belong to the first group 3-1 to any receive antenna of the receive antenna module 31. In the manner, among the channel states e, the group separation module 37 outputs to the priority level calculation module 52-2 a value indicating a channel state of a channel from any one of the pieces of user equipment 2-3 and 2-4 that belong to the second group 3-2 to any receive antenna of the receive antenna module 31. Among the channel states e, the group separation module 37 outputs to the priority level calculation module 52-3 a value indicating a channel state of a channel from any one of the pieces of user equipment 2-5 and 2-6 that belong to the third group 3-3 to any receive antenna of the receive antenna module 31.

Each of the priority level calculation modules 52-1 to 52-3 calculates a priority level for each of the pieces of user equipment that correspond to the channel state e that is input, among the pieces of user equipment 2-1 to 2-6. That is, the priority level calculation module 52-1 calculates a priority level for each of the pieces of user equipment 2-1 and 2-2 that belong to the first group 3-1. In the same manner, the priority level calculation module 52-2 calculates a priority level for each of the pieces of user equipment 2-3 and 2-4 that belong to the second group 3-2, and the priority level calculation module 52-3 calculates a priority level for each of the pieces of user equipment 2-5 and 2-6 that belong to the third group 3-1. For example, if a proportional fairness scheme is used, the priority level calculation modules 52-1 to 52-3 calculate the priority level using Equation (3).

[Math. 3]

$$P(u, m) = \frac{R(u, m)}{R_{ave}(u)} \quad (3)$$

In Equation 3, P(u, m) is a priority level of an m-th resource block for u-th user equipment 2-u. It is seen from Equation 3 that the greater the value is, the higher the priority level of the resource block is. Furthermore, R(u, m) is a prospective throughput on the assumption that the m-th resource block is allocated to the u-th user equipment 2-u, and the R(u, m) is calculated based on the channel state that is output by the group separation module 37. Furthermore, Rave(u) indicates an average throughput that is accomplished until the scheduling timing for the u-th user equipment 2-u.

The resource determination modules 53-1 to 53-3 (allocation determination modules) allocate each resource block (frequency band) to the user equipment that has the highest priority level in the resource block, based on the priority level that is calculated in this manner. That is, the resource determination modules 53-1 to 53-3 allocate the frequency band to each of the pieces of user equipment in the groups, respectively. The resource determination module 53-1 selects the user equipment that has the highest priority level from among the pieces of user equipment 2-1 and 2-2 that belong to the first group 3-1, and allocates the resource block to the selected user equipment. In the same manner, the resource determination module 53-2 selects the user equipment that has the highest priority level from among the pieces of user equipment 2-3 to 2-4 that belong to the second group 3-2, and allocates the resource block to the selected user equipment. The resource determination module 53-3 selects the user equipment that has the highest priority level from among the pieces of user equipment 2-5 to 2-6 that belong to the third group 3-3, and allocates the resource block to the selected user equipment. The resource determination modules 53-1 to 53-3 output the pieces of information a1 to a3 indicating the result of the allocation to the control signal generation module 38, respectively. Moreover, the number of the resource blocks that are allocated to each of the pieces of user equipment 2-1 to 2-6, for example, may be a number that is determined in advance, may be a number that is requested by each of the pieces of user equipment 2-1 to 2-6, and may be a number that is determined according to quality of service (QoS).

Figure 8:
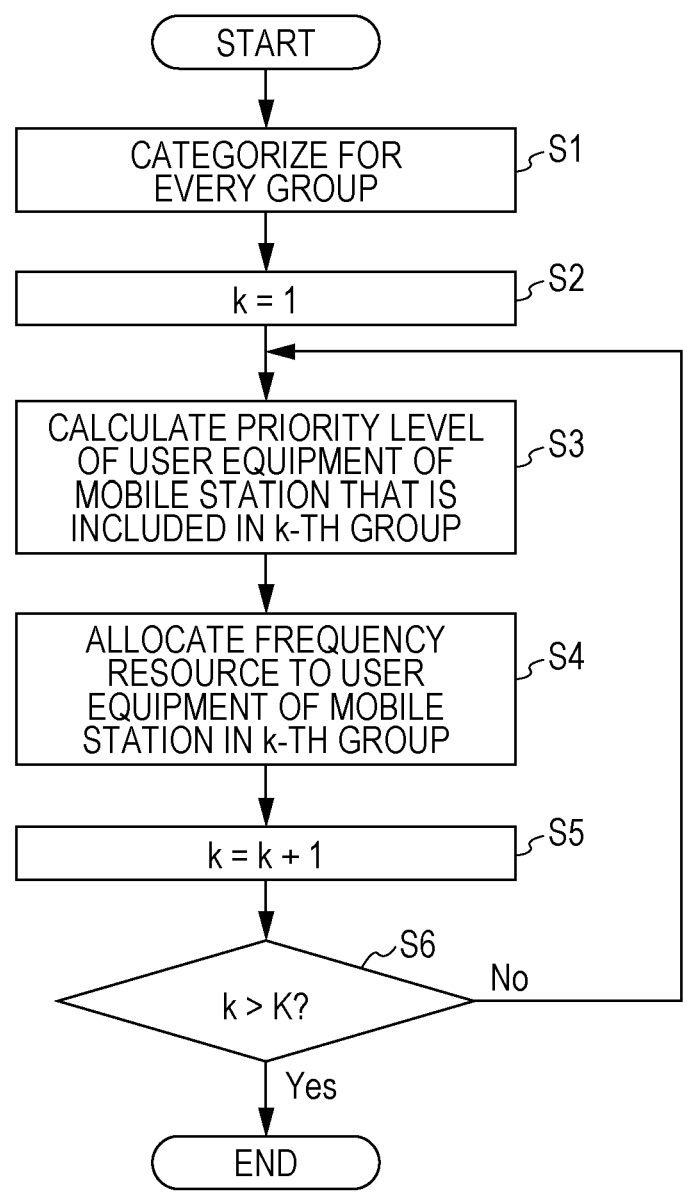
FIG. 8 is a flowchart for describing operation of the scheduling module 37 according to the first embodiment.

FIG. 8 is a flow chart for describing operation of the scheduling module 37. First, in Step S1, the group separation module 51 divides the channel state relating to the pieces of user equipment 2-1 to 2-6 for every block, and outputs a result of the division to each of the priority level calculation modules 52-1 to 52-3. In Step S2, 1 is assigned as a group number k. Next, in Step S3, a k-th priority level calculation module 52-k calculates a priority level of the user equipment that is included in a k-th group. In Step S4, a k-th resource determination module 53-k allocates the frequency resource to the user equipment that is included in the k-th group, and adds 1 to the group number k in Step S5. Thereafter, in Step S6, it is determined whether or not the group number k exceeds a total K (here, "3") of the groups. If k>K, the allocation ends. If not, it is determined that a group to which the frequency allocation has not yet been completed is present, and proceeding to the processing in Step S3 takes place.

Figure 9:
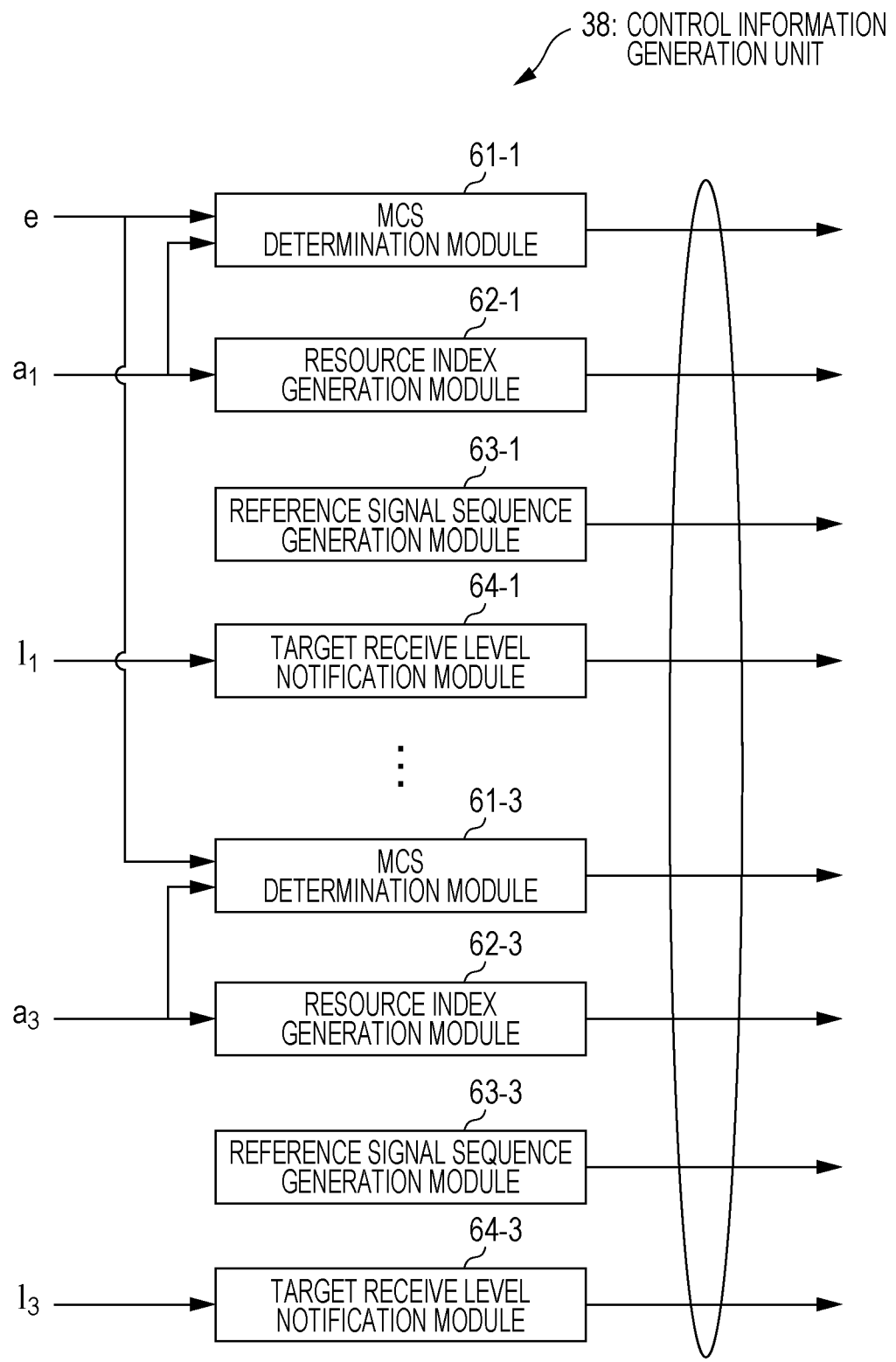
FIG. 9 is a schematic block diagram illustrating a configuration of a control signal generation module 38 according to the first embodiment.

FIG. 9 is a schematic block diagram illustrating a configuration of the control signal generation module 38. The control signal generation module 38 according to the present embodiment generates, as the control information, the control bit indicating a modulation and coding scheme (MCS), a control bit indicating the pattern of the demodulation reference signal, a control bit indicating the resource index, and information indicating the target receive level, and generates the control signals indicating these pieces of control information. Moreover, each time the control signal is generated, the control signal generation module 38 does not need to include all of these pieces of control information, and the transmit timing may differ by the control information. A control information generation module 38 is configured to include MCS determination modules 61-1 to 61-3, resource index generation modules 62-1 to 62-3, reference signal sequence generation modules 63-1 to 63-3, and target receive level notification modules 64-1 to 64-3.

Based on the pieces of information a1 to a3 indicating the result (channel state e) of the sounding of the channel for each of the pieces of user equipment 2-1 to 2-6 and the frequency allocation (resource index), which are input by the channel sounding module 36 and the scheduling module 37, the MCS determination modules 61-1 to 61-3 predict the receive SINR of the signal from each of the pieces of user equipment in each group, and determine the modulation scheme and the coding rate (MCS) that the pieces of user equipment 2-1 to 2-6 included in each group use for transmission. Moreover, the MCS determination module 61-1 determines the MCS's of the pieces of user equipment 2-1 and 2-2 that belong to the first group 3-1, the MCS determination module 61-2 determines the MCS's of the pieces of user equipment 2-3 to 2-4 that belong to the second group 3-2, and the MCS determination module 61-3 determines the MCS's of the pieces of user equipment 2-5 to 2-6 that belong to the third group 3-3.

The resource index generation modules 62-1 to 62-3 perform information source encoding on the pieces of information a1 to a3 indicating the frequency allocation (resource index) relating to each of the pieces of user equipment 2-1 to 2-6 that are included in the groups. In the same manner as the MCS determination modules 61-1 to 61-3, the resource index generation module 62-1 performs the information source encoding on the resource index (information a1 indicating the frequency allocation) of the pieces of user equipment 2-1 and 2-2 that belong to the first group 3-1, the resource index generation module 62-2 performs the information source encoding on the resource index (information a2 indicating the frequency allocation) of the pieces of user equipment 2-3 and 2-4 that belong to the second group 3-2, and the resource index generation module 62-3 performs the information source encoding on the resource index (information a3 indicating the frequency allocation) of the pieces of user equipment 2-5 and 2-6 that belong to the third group 3-3.

For the pieces of user equipment 2-1 to 2-6 that are included in the groups, the reference signal sequence generation modules 63-1 to 63-3 (reference signal determination modules) determine the demodulation reference signal that is transmitted by each piece of user equipment, in such a manner that the demodulation reference signals that are transmitted by the pieces of user equipment that belong to the different groups are orthogonal to one another. The reference signal sequence generation module 63-1 determines the patterns of the demodulation reference signals of the pieces of user equipment 2-1 to 2-2 that belong to the first group 3-1, the reference signal sequence generation module 63-2 determines the patterns of the demodulation reference signals of the pieces of user equipment 2-3 to 2-4 that belong to the second group 3-2, and the reference signal sequence generation module 63-3 determines the patterns of the demodulation reference signals of the pieces of user equipment 2-5 to 2-6 that belong to the third group 3-3. The pattern of the demodulation reference signal to be determined is described in detail below. At this point, the pattern of the demodulation reference signal is information that indicates a combination of the code sequence of the reference signals and the subcarrier in which the reference signal is arranged. Moreover, because it is good to include a parameter for causing the demodulation reference signals to be orthogonal to one another between the groups, if the demodulation reference signals are caused to be orthogonal to one another only in the code sequence to be used, the pattern may be information indicating only the code sequence. In the same manner, if the demodulation reference signals are caused to be orthogonal to one another only in the subcarrier to be arranged, the pattern may be information indicating only the subcarrier.

The target receive level notification modules 64-1 to 64-3 generate a signal that notifies each of the pieces of user equipment 2-1 to 2-6 of pieces of information 11 to 13 indicating the target receive level that is set by the receive level setting module 45. That is, the target receive level notification module 64-1 generates the signal that notifies the pieces of user equipment 2-1 and 2-2, which belong to the first group 3-1, of the information (the UE's own control value, PO_UE_PUSCH) 11 indicating the target receive level for the first group 3-1. The target receive level notification module 64-2 generates the signal that notifies the pieces of user equipment 2-3 and 2-4, which belong to the second group 3-2, of the information 12 indicating the target receive level for the second group 3-2. The target receive level notification module 64-3 generates the signal that notifies the pieces of user equipment 2-5 and 2-6, which belong to the third group 3-3, of the information 13 indicating the target receive level for the third group 3-3.

Figure 10:
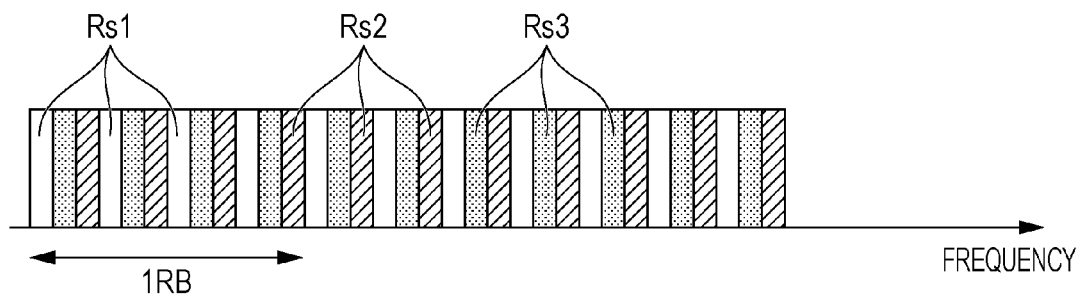
FIG. 10 is a diagram illustrating an example of a reference signal that is generated by the pieces of user equipment 2-1 to 2-6 according to the first embodiment.
Figure 11:
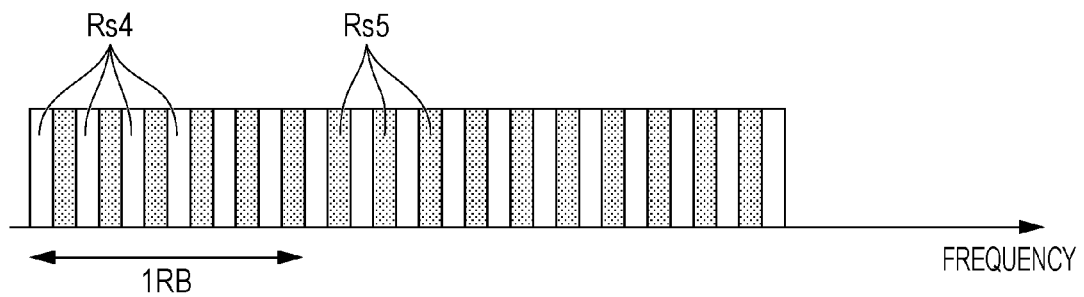
FIG. 11 is a diagram illustrating another example of the reference signal that is generated by the pieces of user equipment 2-1 to 2-6 according to the first embodiment.
Figure 12:
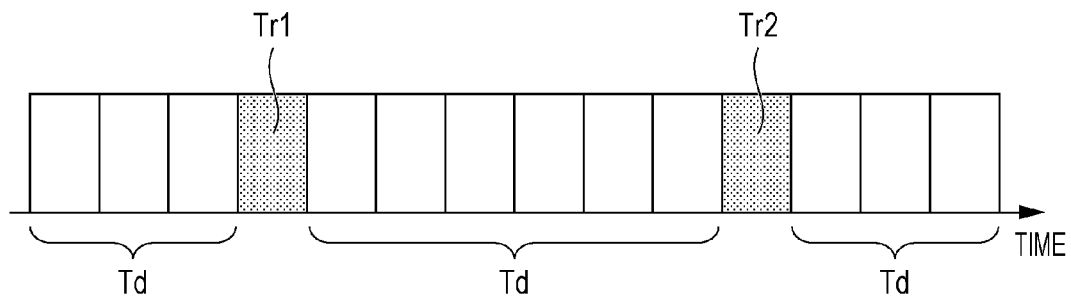
FIG. 12 is a diagram illustrating another example of the reference signal that is generated by the pieces of user equipment 2-1 to 2-6 according to the first embodiment.

FIGS. 10 to 12 are diagrams illustrating examples of the reference signal that is generated by the pieces of user equipment 2-1 to 2-6. That is, FIGS. 10 to 12 are diagrams illustrating the pattern of the demodulation reference signal that is determined by the reference signal sequence generation modules 63-1 to 63-3. In the DMRS separation module 41, in order to separate the demodulation reference signal of each of the pieces of user equipment 2-1 to 2-6, the demodulation reference signals need to be orthogonal to one another among the pieces of user equipment 2-1 to 2-6. At this point, the demodulation reference signal that is transmitted by each of the pieces of the user equipment 2-1 to 2-6 is arranged within the frequency band that is allocated by the scheduling module 37. Because among the pieces of user equipment (for example, the pieces of user equipment 2-1 and 2-2) in the same group, the frequency bands that are allocated by the scheduling module 37 are orthogonal to one another (do not overlap), the demodulation reference signals that are arranged within these frequency bands are orthogonal to one another, without depending on the code sequence to be used or the subcarrier to be arranged. However, because among the pieces of user equipment (for example, the pieces of user equipment 2-1 and 2-3) in the different groups, in some cases, receiving occurs in the same frequency band at the same time, the code sequence to be used or the subcarrier to be arranged needs to be selected in order to cause the frequency bands to be orthogonal to one another. Accordingly, the reference signal sequence generation modules 63-1 to 63-3 determine the pattern of the demodulation reference signal, in such a manner that among the pieces of user equipment that belong to different groups, the subcarrier in which the demodulation reference signal is arranged is different or the code sequences to be used are orthogonal to one another.

An example in FIG. 10 and an example that is configured from FIGS. 11 and 12 are different from each other. The example in FIG. 10 is an example in which the orthogonal intersection is made using a technology called interleaved frequency division multiplexing (IFDM). In FIG. 10, the subcarrier denoted by a white rectangle to which a reference numeral Rs1 is attached is a subcarrier in which the user equipment 2-1 or 2-2 that belongs to the first group 3-1 arranges the reference signal. Among the subcarriers to which the reference numeral Rs1 is attached, the reference signal that is generated by the DMRS generation module 27 of the user equipment 2-1 is arranged by the DMRS multiplexing module 15 in the subcarrier that is allocated by the resource determination module 53-1 of the base station apparatus 1 to the user equipment 2-1. In the same manner, among the subcarriers to which the reference numeral Rs1 is attached, the reference signal that is generated by the DMRS generation module 27 of the user equipment 2-2 is arranged by the DMRS multiplexing module 15 in the subcarrier that is allocated to the user equipment 2-2.

The subcarrier denoted by a rectangle with a slant hatch to which a reference numeral Rs2 is attached is a subcarrier in which the user equipment 2-3 or 2-4 that belongs to the second group 3-2 arranges the reference signal. Which of the pieces of user equipment 2-3 and 2-4 arranges the reference signal in each of the subcarriers Rs2 is determined in the same manner as with the subcarriers Rs1. Furthermore, the subcarrier denoted by a rectangle with half-tone dot meshing to which a reference numeral Rs3 is attached is a subcarrier in which the user equipment 2-5 or 2-6 that belongs to the third group 3-3 arranges the reference signal. Which of the pieces of user equipment 2-5 and 2-6 arranges the reference signal in each of the subcarriers Rs3 is determined in the same manner as with the subcarriers Rs1 and the subcarriers Rs2. As illustrated in FIG. 10, the subcarriers Rs1 to Rs3 iterate starting with a low frequency, in this sequence: subcarriers Rs1, Rs2, Rs3, Rs1, Rs2, Rs3, and so forth. That is, a pattern is designated in which the reference signal sequence generation modules 63-1, 63-2, and 63-3 arrange the demodulation reference signals in (3n+1)-th, (3n+2)-th, and (3n+3)-th subcarriers (n is an integer that is equal to or greater than 0), respectively, starting with a low frequency. Moreover, according to the present embodiment, 1RB in FIG. 10 indicates that one resource block (RB) is configured from the 12 subcarriers.

In this manner, the reference signal is arranged in a frequency direction in the form of teeth in each group, in such a manner that the overlapping does not occur. In this manner, in this example, the reference signal in each group is contained at a ratio of one subcarrier to three subcarriers (in this case, it is said that a repetition factor (RF) is "3"). In the channel estimation module 42 of the base station apparatus 1, when channel estimation is performed for demodulation, after amplitude of the frequency to which the reference signal in the different group is allocated is set to zero, channel performance of the subcarrier that is empty in the form of teeth is complemented based on the channel performance of the subcarrier in which the reference signal for the target user equipment is arranged, and thus frequency performance is estimated. For such an interpolation method, a DFT scheme, a minimum mean square error (MMSE) scheme, or polynomial (including zero order or a linear expression) interpolation may be used.

In FIG. 11, the form of teeth is illustrated, the number of groups is 3, and one out of two subcarriers is allocated to each group. That is, the subcarrier denoted by a white rectangle to which a reference numeral Rs4 is attached is a subcarrier in which any one of the pieces of user equipment 2-1 to 2-4 that belong to the first group 3-1 and the second group 3-2 arranges the reference signal. The subcarrier denoted by a rectangle with half-tone dot meshing to which a reference numeral Rs5 is attached is a subcarrier in which the user equipment 2-5 or 2-6 that belongs to the third group 3-3 arranges the reference signal. Then, in FIG. 11, the subcarriers Rs4 and Rs5 iterate alternately starting with a low frequency, in this sequence: subcarriers Rs4, Rs5, Rs4, Rs5, and so forth.

There is no problem because the third group 3-3 is orthogonal to the other groups, but the pieces of user equipment 2-1 to 2-4 that belong to the first group 3-1 and the second group 3-2 use the same subcarrier and are not orthogonal to one another along a frequency axis. Accordingly, as in FIG. 12, a pattern is used in which the first group 3-1 and the second group 3-2 are orthogonal to one another along a time axis. FIG. 12 illustrates the subframe that is a minimum unit of time resource in an LTE or LTE-A system. A horizontal axis is time, and one square indicates the DFT block that is a signal that is generated with the one-time DFT. Furthermore, one subframe is configured from 14 DFT blocks. As illustrated in FIG. 12, the demodulation reference signal is inserted into a fourth DFT block Tr1 and an eleventh DFT block Tr2 within the subframe. The demodulation reference signal that is included in the fourth DFT block Tr1 and the demodulation reference signal that is included in the eleventh DFT block Tr2 are generated as follows. For the first group 3-1, a result of multiplying a certain value $\alpha$ by [1, 1] (first code sequence) is set to be a first demodulation reference signal and a second demodulation reference signal. Furthermore, for the second group 3-2, a result of multiplying the same $\alpha$ as with the first group 3-1 by [1, −1] (code sequence that is orthogonal to the first code sequence) is set to be a first demodulation reference signal and a second demodulation reference signal. Because [1, 1] and [1, −1] have a relationship in which [1, 1] and [1, −1] are orthogonal to one another, although the same frequency is used, the frequencies can be separated in the base station apparatus 1 that is a receiver.

Moreover, any intersection in the case of a combination of FIGS. 10 to 12 may be possible. Furthermore, at this point, the case where the group's own demodulation reference signals are caused to be orthogonal to one another is described. However, although the user equipment's own demodulation reference signals are caused to be orthogonal to one another, the same processing can be realized. Furthermore, if the band is the same, there are various orthogonal codes, such as a cyclic shift (CS) or Walsh code. In such case, a combination of these may be possible, and as a result, the demodulation reference signals that are orthogonal to one another between each group may be given. By doing this, the precision of the channel estimation at the receiving side is increased.

Moreover, according to the present embodiment, the UE's own control value, PO_UE_PUSCH that is the information indicating the target receive level is described as being generated by the control information generation module 38 and thus being transmitted through the transmit module 39 and the transmit antenna 47. At the time of the transmission, the control value, PO_UE_PUSCH may be transmitted over a physical control channel (for example, physical downlink control channel (PDCCH)), and may be transmitted over a higher layer control channel such as an RRC signal.

Furthermore, if the signal is detected serially by the signal detection module 44 in the same manner as with SIC, the detection may begin with the signal of the user equipment that belongs to the group with the high target receive level, based on the result of the setting by the group setting module 46. If the signal is serially detected, because the detection beginning with a high-power signal makes it easy to correctly separate the signal, a superior bit error rate is obtained by doing this.

In this manner, according to the present embodiment, while the pieces of user equipment are grouped and the target receive power is changed between each group, the frequency bands that are allocated only among the different groups are allowed to overlap. Accordingly, although the frequency bands overlap, it is easy for the signal detection module 44 of the base station apparatus 1 to correctly separate the signals because the receive power of the signal is different among the signals of the user equipment that overlap. That is, a superior bit error rate is obtained. Furthermore, because there are no restrictive conditions such as an allowable overlap rate in the related art, an easy scheduling scheme can be used within each group. Moreover, because portions (in which the number of the items of data that are spatial-multiplexed is greater than the number of receive antennas) that overlap in a non-orthogonal manner, that is, the wireless resources, can be effectively put to practical use, a superior throughput is obtained.

Furthermore, because the receive power is different among the groups, when the scheduling is performed, the frequency band that is allocated to each of the pieces of user equipment 2-1 to 2-6.

Second Embodiment

A second embodiment of the present invention is described below referring to the drawings. According to the present embodiment, an example of a case where a fractional transmit power control is combined with the first embodiment is illustrated. A configuration of a base station apparatus 71 according to the present embodiment is the same as the base station apparatus 1 according to the first embodiment with the exception that there are differences in the operation of the group setting module 46 and the operation of the receive level setting module 45. Furthermore, configurations of pieces of user equipment 72-1 to 72-6 according to the present embodiment are the same as for the pieces of user equipment 2-1 to 2-6 with the exception that there are differences in the operation of the higher layer processing module 29 and the operation of the transmit power control module 20. At this point, only the transmit power control module 20, the higher layer processing module 29, the receive level setting module 45, and the group setting module 46, which are different from those according to the first embodiment, are described, and descriptions of other portions are omitted.

The higher layer processing module 29 according to the present embodiment obtains a value $\alpha c(j)$ in Equation (1) from the control information on the higher layer, and outputs the value $\alpha c(j)$ as the transmit power control information P to the transmit power control module 20.

The transmit power control module 20 according to the present embodiment calculates the transmit power value using Equation (1), based on the path loss PL received from the receive module 23, the transmit power control information P received from the higher layer processing module 29, and the number M of the resource blocks received from the resource identification module 26, and outputs the calculated transmit power value to the transmit module 21. According to the present embodiment, as described above, the value $\alpha c(j)$ is received as the transmit power control information P from the higher layer processing module 29. Moreover, according to the present embodiment, predetermined values for other parameters are used in Equation (1), but other parameters may be notified from the base station apparatus 71.

The receive level setting module 45 according to the present embodiment sets $\alpha c(j)$ in Equation (1) to a value (here, a value smaller than 1) other than "1", and outputs the value as the information li indicating the target receive level to the control signal generation module 38. In this manner, with $\alpha c(j) < 1$ in Equation (1), fractional transmit power control can be performed.

Figure 13:
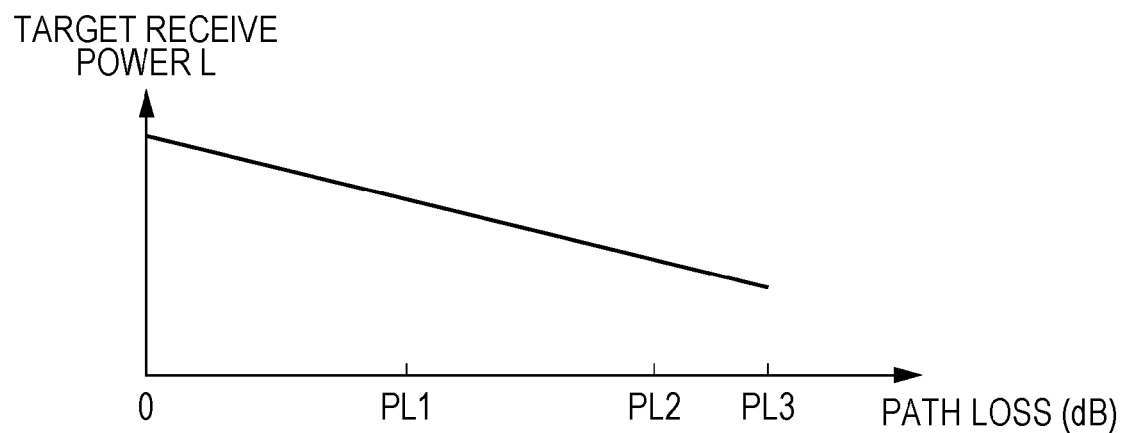
FIG. 13 is a graph illustrating a relationship between a path loss and target receive power according to a second embodiment of the present invention.

FIG. 13 is a graph illustrating a relationship between the path loss and the target receive power in the fractional transmit power control. In FIG. 13, a horizontal axis indicates the path loss value PL and a vertical axis indicates the target receive power L in Equation (1). FIG. 13 illustrates an example in which $\alpha c(j)$ is set to a value smaller than 1. That is, the transmit power control module 20 according to the present embodiment calculates the transmit power value using Equation (1) in which $\alpha c(j)$ is set to a value smaller than 1.

The path loss is set to be a value that is proportional to a distance from the base station apparatus 71 to the user equipment 72. For this reason, this means that in the case of a graph decreasing to the right as illustrated in FIG. 13, the greater the distance, the smaller the desired receive power (target receive power) in the base station apparatus 71. In FIG. 13, if a position is comparatively near the base station apparatus 71, the path loss of which is PL1, the first user equipment 72 has the comparatively high target receive power. Furthermore, if the position is comparatively remote from the base station apparatus 71, the second user equipment 72 the path loss of which is PL1 and the third equipment 72 the path loss of which is PL3 have lower target receive power. Furthermore, for a difference in the amount of the target receive power L, it is possible that the smaller $\alpha c(j)$, the greater the difference is caused.

The group setting module 46 according to the present embodiment groups the pieces of user equipment 72-1 to 72-6 based on the amount of the target receive power or the amount of the path loss. At this point, according to the present embodiment, the pieces of user equipment 72-1 to 72-6 report the information indicating the path loss or the receive signal power that the pieces of user equipment 72-1 to 72-6 estimate based on a downlink reference signal, to the base station apparatus 71 using a higher layer. The group setting module 46 groups the pieces of user equipment 72-1 to 72-6 based on these pieces of information (that is, the path loss or the receive signal power) that are reported.

Figure 14:
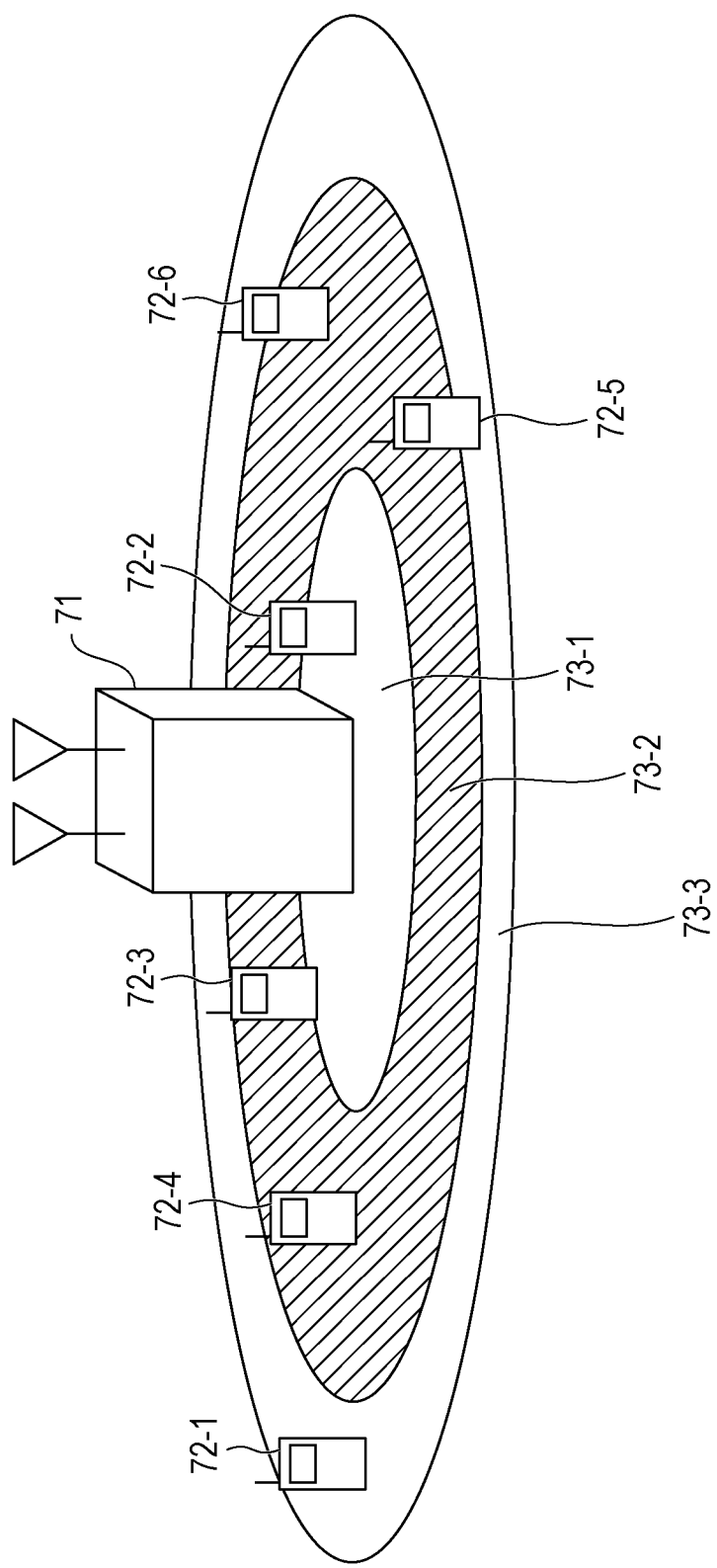
FIG. 14 is a diagram for describing grouping by a group setting module 46 according to the second embodiment.

FIG. 14 is a diagram for describing grouping by the group setting module 46. As illustrated in FIG. 14, the group setting module 46 divides the user equipment 72-1 to 72-6 into three groups according to a distance from the base station apparatus 71, using the path loss or the receive power from the base station apparatus 71. At this time, the first group, the second group, and the third group are set to be 73-1, 73-2, and 73-3, respectively. That is, the arrangement begins with the user equipment (the path loss of which is small) that is nearest the base station apparatus 71 among the pieces of user equipment 72-1 to 72-6, and the pieces of user equipment are divided into the three groups in such a manner that the number of the pieces of user equipment that belong to each group is the same. Moreover, according to the present embodiment, the grouping is performed in such a manner that the number of the pieces of user equipment that belong to each group is the same, but the grouping method is not limited to this. For example, distance ranges that correspond to the groups, respectively, are determined in advance, and the grouping may be performed depending on which range the distance for each piece of user equipment belongs to.

In this manner, by combining the fractional transmit power control and the grouping described above, a difference in the receive power in the base station apparatus 71 occurs among the signals from the pieces of user equipment that belong to different groups, in the same manner as with the first embodiment. According to the present embodiment, because the allocated frequency bands are allowed to overlap only among different groups, a superior bit error rate is also obtained in the same manner as with the first embodiment. Furthermore, because there are no restrictive conditions such as the allowable overlap rate in the related art, the easy scheduling scheme can be used within each group. Moreover, because portions (the number of pieces of user equipment that overlap is greater than the number of receive antennas) that overlap in a non-orthogonal manner, that is, the wireless resources, can be effectively put to practical use, a superior throughput is obtained.

Furthermore, for example, control that increases the difference in the receive power by adjusting $\alpha c(j)$ may be performed at the same time, such as when the difference in the path loss among the pieces of user equipment 72-1 to 72-6 is small.

Third Embodiment

A third embodiment of the present invention is described below referring to the drawings. According to the present embodiment, the grouping is performed randomly. A configuration of a base station apparatus 81 according to the present embodiment is the same as the base station apparatus 1 according to the first embodiment or the base station apparatus 71 according to the second embodiment with the exception that there is a difference in the operation of the group setting module 46. Furthermore, configurations of pieces of user equipment 82-1 to 82-6 according to the present embodiment are the same as those of the pieces of user equipment 2-1 to 2-6 according to the first embodiment or those of the pieces of user equipment 72-1 to 72-6 according to the second embodiment.

Figure 15:
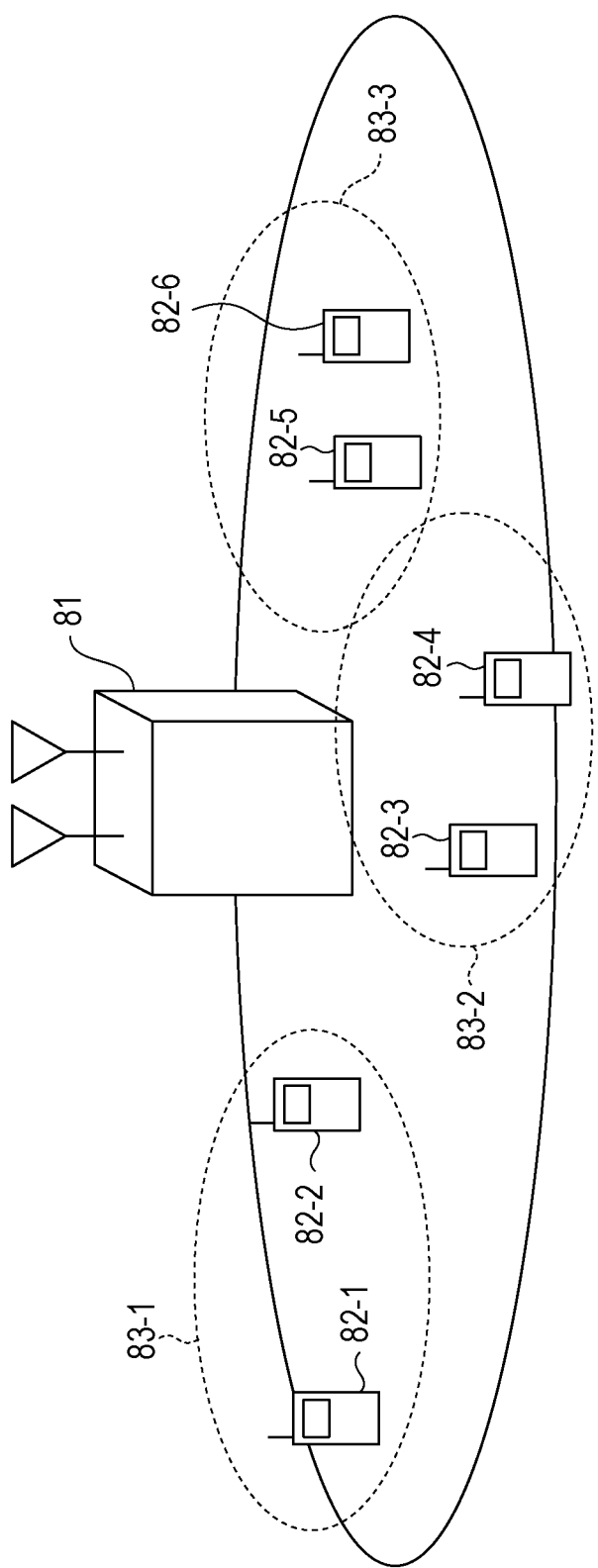
FIG. 15 is a diagram for describing the grouping by the group setting module 46 according to a third embodiment of the present invention.

FIG. 15 is a diagram for describing the grouping by the group setting module 46 according to the present embodiment. In FIG. 15, the pieces of user equipment 82-1 to 82-6 that connect to the base station apparatus 81 are divided into three groups 83-1 to 83-3. At this point, the present embodiment is different from the first and second embodiments in that the group setting module 46 performs the grouping randomly.

According to the present embodiment, for example, the grouping is performed in the order of numbers (ID) of the pieces of user equipment 82-1 to 82-6 that the base station apparatus 81 sets in order to manage the pieces of user equipment 82-1 to 82-6. Accordingly, a control load on the base station apparatus 81 side can be reduced. In the same manner as the receive level setting module 45 according to the first embodiment or the second embodiment, the receive level setting module 45 of the base station apparatus 81 causes the difference in the receive power level necessary for detecting the signals of the pieces of user equipment 82-1 to 82-6. By doing this, frequency-overlapped multiple access can be performed efficiently, and the throughput is improved.

Figure 16:
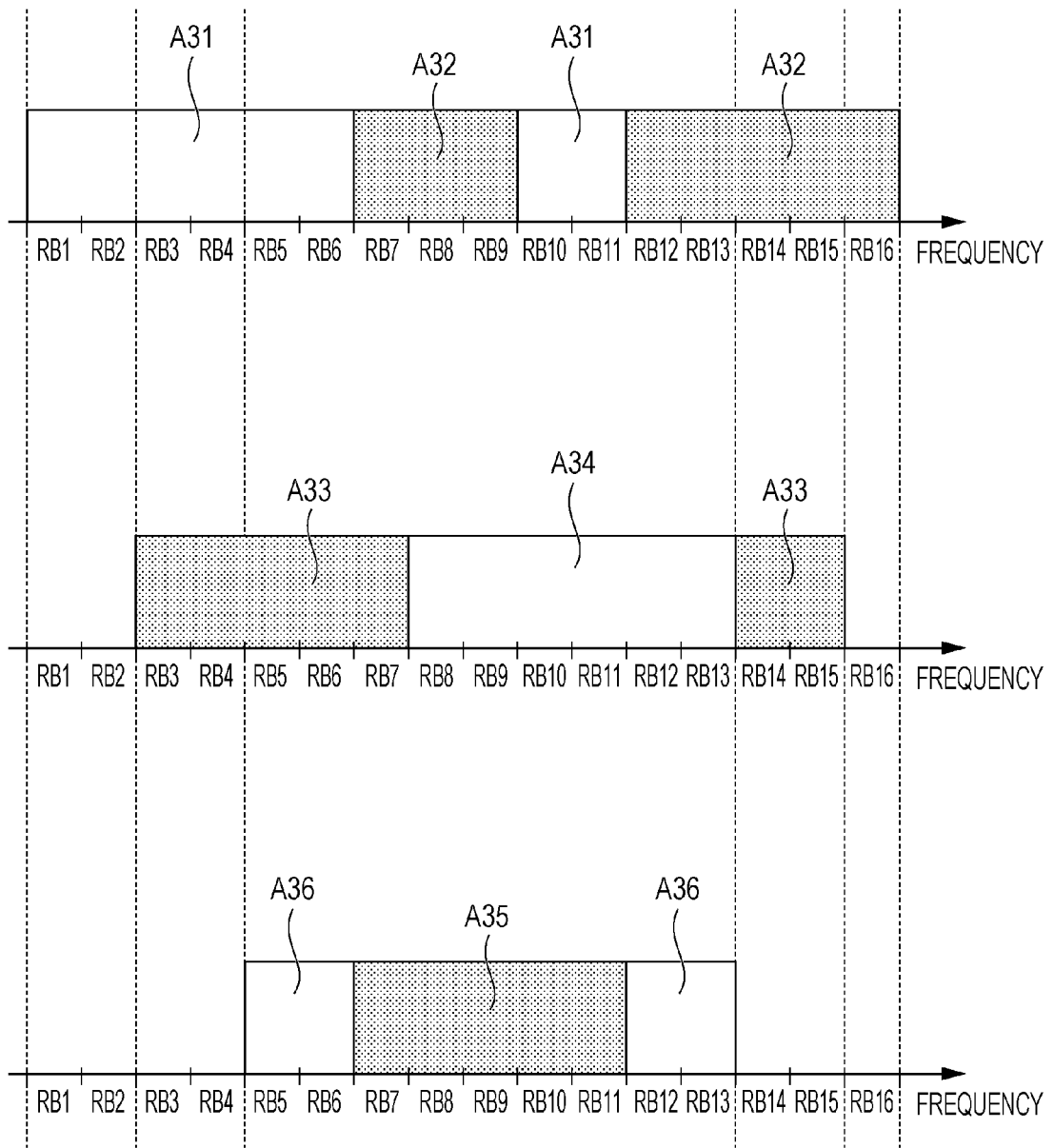
FIG. 16 is a diagram illustrating a modification example of the allocation of the frequency band according to the first to third embodiments of the present invention.

Furthermore, according to the first to third embodiments, for example, when it is determined that the signal is difficult to detect, such as when the bit error rate in the signal detection module 44 exceeds a threshold that is set in advance, the scheduling module 37 may make a bandwidth that can be allocated to each group different, as illustrated in FIG. 16. Descriptions are provided with the first embodiment as an example. In an example in FIG. 16, the first section from above indicates the frequency band that is allocated in the first group, the second section indicates the frequency band that is allocated in the second group, and the third section indicates the frequency band that is allocated in the second group.

In the first section, a frequency band A31 that is configured from the resource blocks RB1 to RB6, RB10, and RB11 is allocated to the user equipment 2-1. Furthermore, a frequency band A32 that is configured from the resource blocks RB7 to RB9 and RB12 to RB16 is allocated to the user equipment 2-2. In the second section, a frequency band A33 that is configured from the resource blocks RB3 to RB7, RB14, and RB15 is allocated to the user equipment 2-3. Furthermore, a frequency band A34 that is configured from the resource blocks RB8 to RB13 is allocated to the user equipment 2-4. In the third section, a frequency band A35 that is configured from the resource blocks RB7 to RB11 is allocated to the user equipment 2-5. Furthermore, a frequency band A36 that is configured from the resource blocks RB5, RB6, RB12, and RB13 is allocated to the user equipment 2-6.

That is, the frequency band that corresponds to the first group is the resource blocks RB1 to RB16, the frequency band that corresponds to the second group is the resource blocks RB3 to RB15 that are narrower than the resource blocks RB1 to RB16, and the frequency band that corresponds to the third group is the resource blocks RB5 to RB13 that are narrower than the resource blocks RB3 to RB15. Then, the resource determination module 53-1 selects the frequency band that is allocated to each of the pieces of user equipment 2-1 and 2-2 that belong to the first group, from among the resource blocks RB1 to RB16, that is, from among the frequency bands that correspond to the first group. In the same manner, the resource determination module 53-2 selects the frequency band that is allocated to each of the pieces of user equipment 2-3 and 2-4 that belong to the second group, from among the frequency bands that correspond to the second group. The resource determination module 53-3 selects the frequency band that is allocated to each of the pieces of user equipment 2-4 and 2-5 that belong to the third group, from among the frequency bands that correspond to the third group. In this manner, the frequency band that corresponds to each group is made different, and the frequency band (RB3, RB4, RB14, and RB15 in FIG. 16) in which the number of the items of data that are spatial-multiplexed is small or the frequency band (RB1, RB2, and RB16 in FIG. 16) in which the number of the items of data that are spatial-multiplexed is 1 is caused to occur. Thus, the signal can be easily detected in these frequency bands. Therefore, the bit error rate can be improved. However, also in this case, the frequency band that corresponds to each group includes the frequency band that overlaps the frequency band that corresponds to other groups. Moreover, as an example in which the group that has a narrow frequency is determined, there are a method in which the high transmit power or the low receive power is set to the group that has a narrow frequency, and the like, but any limitation to this is not imposed.

Furthermore, because there are no restrictive conditions such as the allowable overlap rate in the related art, the easy scheduling scheme can be used within each group.

Moreover, according to each of the embodiments described above, control of the transmit power may be performed by controlling an amplitude ratio at the time of the amplification in the transmit module 21, and may be performed by controlling an amplitude of a digital signal, such as a modulation symbol generated by the modulation module 12, a time signal that is output by the IFFT module 16, and a combination of these may be possible.

Furthermore, a program for realizing some of or all functions of each of the pieces of user equipment 2-1 to 2-6, 72-1 to 72-6, and 82-1 to 82-6 and each of the base station apparatuses 1, 71, and 81 according to each of the embodiments described above may be recorded on a computer-readable recording medium, a computer system may be caused to read and run the program recorded on the recording medium, and thus the user equipment and the base station apparatus may be realized. Moreover, the "computer system" here is defined as including an OS and hardware components such as a peripheral device.

Furthermore, the "computer-readable recording medium" refers to a portable medium such as a flexible disk, a magneto-optical disk, ROM, and CD-ROM, and a storage device such as a hard disk that is built into the computer system. Moreover, the "computer-readable recording medium" is defined as including whatever dynamically retains the program for a short period of time, such as a communication line that is used when transmitting the program over a network such as the Internet or over a communication circuit such as a telephone circuit and as including whatever retains the program for a constant period of time, such as volatile memory within the computer system, which functions as a server or a client in the case of including the program dynamically. Furthermore, the program may be one for realizing some of the functions described above and additionally may be one that can realize the functions described above in combination with a program that is already recorded in the computer system.

Some of or all functions of each of the pieces of user equipment 2-1 to 2-6, 72-1 to 72-6, and 82-1 to 82-6 and each of the base station apparatuses 1, 71, and 81 according to each of the embodiments described above may be realized as an LSI that is typically an integrated circuit. Each functional block of the pieces of user equipment 2-1 to 2-6, 72-1 to 72-6, and 82-1 to 82-6 and of the base station apparatuses 1, 71, and 81 may be individually built into a chip, and some of, or all of the functional blocks may be integrated into a chip. Furthermore, a technique of the integrated circuit is not limited to the LSI, and an integrated circuit for the functional block may be realized as a dedicated circuit or a general-purpose processor. Furthermore, if a technology of an integrated circuit that substitutes the LSI will appear with advances in semiconductor technology, it is possible to use an integrated circuit to which such a technology is applied.

The embodiments of the invention are described above in detail referring to the drawings, but the specific configuration is not limited to the embodiments and includes an amendment to a design that falls within a scope not deviating from the gist of the present invention.

INDUSTRIAL APPLICABILITY

The present invention is suitable for use in a mobile communication system in which a portable telephone is set to be user equipment, but is not limited to this.

REFERENCE SIGNS LIST

1, 71, 81 BASE STATION APPARATUS
2-1 to 2-6, 72-1 to 72-6, 82-1 to 82-6 USER EQUIPMENT
3-1 FIRST GROUP
3-2 SECOND GROUP
3-3 THIRD GROUP
10 WIRELESS COMMUNICATION SYSTEM
11 CODING MODULE
12 MODULATION MODULE
13 DFT MODULE
14 RESOURCE ALLOCATION MODULE
15 DMRS MULTIPLEXING MODULE
16 IFFT MODULE
17 SWITCHING MODULE
18 SRS MULTIPLEXING MODULE
19 CP INSERTION MODULE
20 TRANSMIT POWER CONTROL MODULE
21 TRANSMIT MODULE
22 TRANSMIT AND RECEIVE ANTENNA
23 RECEIVE MODULE
24 CONTROL INFORMATION DETECTION MODULE
25 MCS IDENTIFICATION MODULE
26 RESOURCE IDENTIFICATION MODULE
27 DMRS GENERATION MODULE
28 SRS GENERATION MODULE
29 HIGHER LAYER PROCESSING MODULE
31 RECEIVE ANTENNA MODULE
32 RECEIVE MODULE
33 CP REMOVAL MODULE
34 SWITCHING MODULE
35 SRS SEPARATION MODULE
36 CHANNEL SOUNDING MODULE
37 SCHEDULING MODULE
38 CONTROL SIGNAL GENERATION MODULE
39 TRANSMIT MODULE
40 FFT MODULE
41 DMRS SEPARATION MODULE
42 CHANNEL ESTIMATION MODULE
43 RESOURCE SEPARATION MODULE
44 SIGNAL DETECTION MODULE
45 RECEIVE LEVEL SETTING MODULE
46 GROUP SETTING MODULE
47 TRANSMIT ANTENNA
48 HIGHER LAYER PROCESSING MODULE
51 GROUP SEPARATION MODULE
52-1 to 52-3 PRIORITY LEVEL CALCULATION MODULE
53-1 to 53-3 RESOURCE DETERMINATION MODULE
61-1 to 61-3 MCS DETERMINATION MODULE
62-1 to 62-3 RESOURCE INDEX GENERATION MODULE
63-1 to 63-3 REFERENCE SIGNAL SEQUENCE GENERATION MODULE
64-1 to 64-3 TARGET RECEIVE LEVEL NOTIFICATION MODULE

The invention claimed is:

1. A control station apparatus that allocates a frequency band which multiple communication apparatuses each use for communication, the apparatus comprising:
   group setting circuitry that divides the multiple communication apparatuses into multiple groups;
   scheduling circuitry that determines the frequency band that is allocated to each of the communication apparatuses; and
   receive power setting circuitry that sets different target receive levels for every group of the multiple groups, wherein
   the scheduling circuitry allows the allocated frequency band to be shared by the communication apparatuses that are different from each other in terms of the multiple groups to which each of the communication apparatuses belongs; and the receive power setting circuitry sets the different target receive levels with a fractional transmit power control.

2. The control station apparatus according to claim 1, wherein the group setting circuitry divides the communication apparatuses into the multiple groups, based on a receive power or a path loss.

3. The control station apparatus according to claim 1, wherein the group setting circuitry divides the communication apparatuses into the multiple groups, based on identification numbers of the communication apparatuses.

4. The control station apparatus according to claim 1, further comprising:

reference signal determination circuitry that determines a reference signal that is transmitted by each of the communication apparatuses, in such a manner that the reference signals, transmitted by the communication apparatuses that belong to different ones of multiple groups, are orthogonal to one another.

5. The control station apparatus according to claim 1, wherein the scheduling circuitry selects the frequency band that is allocated to each of the communication apparatuses, from among the frequency bands that correspond to ones of the multiple groups to which the communication apparatus belong, and wherein the frequency band that corresponds to one of the groups includes a frequency band that overlaps the frequency band which corresponds to at least another one of the groups.

6. The control station apparatus according to claim 1, further comprising:

signal detection circuitry module that detects a signal, transmitted by each of the communication apparatuses, from a receive signal, using an interference cancellation technology.

7. A method of allocating a frequency band that multiple communication apparatuses each use for transmission, the method comprising:

a first process of dividing the multiple communication apparatuses into multiple groups;

a second process of determining the frequency band that is allocated to each of the communication apparatuses; and a third process of setting different target receive levels for every group of the multiple groups, wherein in the second process, the allocated frequency band is allowed to be shared by the communication apparatuses that are different from each other in terms of the multiple groups to which each of the communication apparatuses belongs; and in the third process, the different target receive levels are set with a fractional transmit power control.

8. A non-transitory computer-readable medium including a computer program for causing a computer of a control station apparatus, which performs allocation of a frequency band that multiple communication apparatuses each use for communication, to perform a method comprising:

a first process of dividing the multiple communication apparatuses into multiple groups;

a second process or determining the frequency band that is allocated to each of the communication apparatuses; and a third process of setting different target receive levels for every group of the multiple groups, wherein in the second process, the allocated frequency band is allowed to be shared by the communication apparatuses that are different from each other in terms of the multiple groups to which each of the communication apparatuses belongs; and in the third process the different target receive levels are set with a fractional transmit power control.

* * * * *